(12) United States Patent
Yeung et al.

(10) Patent No.: US 10,961,908 B1
(45) Date of Patent: Mar. 30, 2021

(54) SYSTEMS AND METHODS TO ENHANCE INTAKE AIR FLOW TO A GAS TURBINE ENGINE OF A HYDRAULIC FRACTURING UNIT

(71) Applicant: BJ Energy Solutions, LLC, Houston, TX (US)

(72) Inventors: Tony Yeung, Tomball, TX (US); Ricardo Rodriguez-Ramon, Tomball, TX (US); Joseph Foster, Tomball, TX (US)

(73) Assignee: BJ Energy Solutions, LLC, Houston, TX (US)

( * ) Notice: Subject to any disclaimer, the term of this patent is extended or adjusted under 35 U.S.C. 154(b) by 0 days.

(21) Appl. No.: 16/946,291

(22) Filed: Jun. 15, 2020

Related U.S. Application Data

(60) Provisional application No. 62/704,987, filed on Jun. 5, 2020.

(51) Int. Cl.
*E21B 43/26* (2006.01)
*F02C 7/055* (2006.01)
(Continued)

(52) U.S. Cl.
CPC .............. *F02C 7/055* (2013.01); *F01D 15/10* (2013.01); *F02C 7/057* (2013.01); *F04B 17/05* (2013.01); *E21B 43/2607* (2020.05)

(58) Field of Classification Search
CPC .. B60H 1/00671; B60H 1/00692; B60H 1/26; B60H 2001/00731; E21B 42/2607;
(Continued)

(56) References Cited

U.S. PATENT DOCUMENTS

| | | |
|---|---|---|
| 2,498,229 A | 2/1950 | Adler |
| 3,191,517 A | 6/1965 | Solzman |

(Continued)

FOREIGN PATENT DOCUMENTS

| | | |
|---|---|---|
| CA | 2876687 A1 | 5/2014 |
| CA | 2693567 | 9/2014 |

(Continued)

OTHER PUBLICATIONS

ResearchGate, Answer by Byron Woolridge, found at https://www.researchgate.net/post/How_can_we_improve_the_efficiency_of_the_gas_turbine_cycles, Jan. 1, 2013.
(Continued)

*Primary Examiner* — Todd E Manahan
*Assistant Examiner* — Sean V Meiller
(74) *Attorney, Agent, or Firm* — Womble Bond Dickinson (US) LLP

(57) ABSTRACT

Systems and methods to increase intake air flow to a gas turbine engine of a hydraulic fracturing unit when positioned in an enclosure may include providing an intake expansion assembly to enhance intake air flow to the gas turbine engine. The intake expansion assembly may include an intake expansion wall defining a plurality of intake ports positioned to supply intake air to the gas turbine engine. The intake expansion assembly also may include one or more actuators connected to a main housing of the enclosure and the intake expansion assembly. The one or more actuators may be positioned to cause the intake expansion wall to move relative to the main housing between a first position preventing air flow through the plurality of intake ports and a second position providing air flow through the plurality of intake ports to an interior of the enclosure.

30 Claims, 11 Drawing Sheets

(51) Int. Cl.
 *F02C 7/057* (2006.01)
 *F04B 17/05* (2006.01)
 *F01D 15/10* (2006.01)

(58) Field of Classification Search
 CPC .... F04B 17/05; F02C 6/00; F02C 7/05; F02C 7/055; F02C 7/057; F02C 7/141; F02C 7/143; F02C 7/042; F02C 7/20; F02C 9/16; F01D 15/08; F01D 15/10; B66F 7/16; F05D 2220/76
 USPC .......................................... 431/1, 254, 173
 See application file for complete search history.

(56) References Cited

U.S. PATENT DOCUMENTS

| | | |
|---|---|---|
| 3,257,031 A | 6/1966 | Dietz |
| 3,378,074 A | 4/1968 | Kiel |
| 3,739,872 A | 6/1973 | McNair |
| 3,773,438 A | 11/1973 | Hall et al. |
| 3,791,682 A | 2/1974 | Mitchell |
| 3,796,045 A | 3/1974 | Foster |
| 3,820,922 A | 6/1974 | Buse et al. |
| 4,010,613 A | 3/1977 | McInerney |
| 4,031,407 A | 6/1977 | Reed |
| 4,086,976 A | 5/1978 | Holm et al. |
| 4,222,229 A | 9/1980 | Uram |
| 4,269,569 A | 5/1981 | Hoover |
| 4,311,395 A | 1/1982 | Douthitt et al. |
| 4,357,027 A | 11/1982 | Zeitlow |
| 4,402,504 A | 9/1983 | Christian |
| 4,457,325 A | 7/1984 | Green |
| 4,470,771 A | 9/1984 | Hall et al. |
| 4,574,880 A | 3/1986 | Handke |
| 4,754,607 A | 7/1988 | Mackay |
| 4,782,244 A | 11/1988 | Wakimoto |
| 4,796,777 A | 1/1989 | Keller |
| 4,913,625 A | 4/1990 | Gerlowski |
| 4,983,259 A | 1/1991 | Duncan |
| 4,990,058 A | 2/1991 | Eslinger |
| 5,537,813 A | 7/1996 | Davis et al. |
| 5,553,514 A | 9/1996 | Walkowc |
| 5,560,195 A | 10/1996 | Anderson et al. |
| 5,622,245 A | 4/1997 | Reik |
| 5,651,400 A | 7/1997 | Corts et al. |
| 5,678,460 A | 10/1997 | Walkowc |
| 5,717,172 A | 2/1998 | Griffin, Jr. et al. |
| 5,983,962 A | 11/1999 | Gerardot |
| 6,041,856 A | 3/2000 | Thrasher et al. |
| 6,050,080 A | 4/2000 | Horner |
| 6,071,188 A | 6/2000 | O'Neill et al. |
| 6,123,751 A | 9/2000 | Nelson et al. |
| 6,129,335 A | 10/2000 | Yokogi |
| 6,145,318 A | 11/2000 | Kaplan et al. |
| 6,279,309 B1 | 8/2001 | Lawlor, II et al. |
| 6,321,860 B1 | 11/2001 | Reddoch |
| 6,334,746 B1 | 1/2002 | Nguyen et al. |
| 6,530,224 B1 | 3/2003 | Conchieri |
| 6,543,395 B2 | 4/2003 | Green |
| 6,655,922 B1 | 12/2003 | Flek |
| 6,765,304 B2 | 7/2004 | Baten et al. |
| 6,786,051 B2 | 9/2004 | Kristich et al. |
| 6,851,514 B2 | 2/2005 | Han et al. |
| 6,859,740 B2 | 2/2005 | Stephenson et al. |
| 6,901,735 B2 | 6/2005 | Lohn |
| 7,065,953 B1 | 6/2006 | Kopko |
| 7,222,015 B2 | 5/2007 | Davis et al. |
| 7,388,303 B2 | 6/2008 | Seiver |
| 7,545,130 B2 | 6/2009 | Latham |
| 7,552,903 B2 | 6/2009 | Dunn et al. |
| 7,563,076 B2 | 7/2009 | Brunet et al. |
| 7,627,416 B2 | 12/2009 | Batenburg et al. |
| 7,677,316 B2 | 3/2010 | Butler et al. |
| 7,721,521 B2 | 5/2010 | Kunkle et al. |
| 7,730,711 B2 | 6/2010 | Kunkle et al. |
| 7,789,452 B2 * | 9/2010 | Dempsey .............. B60P 3/341 296/173 |
| 7,845,413 B2 | 12/2010 | Shampine et al. |
| 7,900,724 B2 | 3/2011 | Promersberger et al. |
| 7,921,914 B2 | 4/2011 | Bruins et al. |
| 7,938,151 B2 | 5/2011 | Höckner |
| 7,980,357 B2 | 7/2011 | Edwards |
| 8,083,504 B2 | 12/2011 | Williams et al. |
| 8,186,334 B2 | 5/2012 | Ooyama |
| 8,196,555 B2 | 6/2012 | Ikeda et al. |
| 8,316,936 B2 | 11/2012 | Roddy et al. |
| 8,414,673 B2 | 4/2013 | Raje et al. |
| 8,506,267 B2 | 8/2013 | Gambier et al. |
| 8,575,873 B2 | 11/2013 | Peterson et al. |
| 8,616,005 B1 | 12/2013 | Cousino, Sr. et al. |
| 8,621,873 B2 | 1/2014 | Robertson et al. |
| 8,672,606 B2 | 3/2014 | Glynn et al. |
| 8,714,253 B2 | 5/2014 | Sherwood et al. |
| 8,770,329 B2 | 7/2014 | Spitler |
| 8,789,601 B2 | 7/2014 | Broussard et al. |
| 8,794,307 B2 | 8/2014 | Coquilleau et al. |
| 8,851,441 B2 | 10/2014 | Acuna et al. |
| 8,905,056 B2 | 12/2014 | Kendrick |
| 8,973,560 B2 | 3/2015 | Krug |
| 8,997,904 B2 | 4/2015 | Cryer et al. |
| 9,032,620 B2 | 5/2015 | Frassinelli et al. |
| 9,057,247 B2 | 6/2015 | Kumar et al. |
| 9,103,193 B2 | 8/2015 | Coli et al. |
| 9,121,257 B2 | 9/2015 | Coli et al. |
| 9,140,110 B2 | 9/2015 | Coli et al. |
| 9,187,982 B2 | 11/2015 | Dehring et al. |
| 9,212,643 B2 | 12/2015 | Deliyski |
| 9,341,055 B2 | 5/2016 | Weightman et al. |
| 9,346,662 B2 | 5/2016 | Van Vliet et al. |
| 9,366,114 B2 | 6/2016 | Coli et al. |
| 9,376,786 B2 | 6/2016 | Numasawa |
| 9,394,829 B2 | 7/2016 | Cabeen et al. |
| 9,395,049 B2 | 7/2016 | Vicknair et al. |
| 9,401,670 B2 | 7/2016 | Minato et al. |
| 9,410,410 B2 | 8/2016 | Broussard et al. |
| 9,410,546 B2 | 8/2016 | Jaeger et al. |
| 9,429,078 B1 | 8/2016 | Crowe et al. |
| 9,493,997 B2 | 11/2016 | Liu et al. |
| 9,512,783 B2 | 12/2016 | Veilleux et al. |
| 9,534,473 B2 | 1/2017 | Morris et al. |
| 9,546,652 B2 | 1/2017 | Yin |
| 9,550,501 B2 | 1/2017 | Ledbetter |
| 9,556,721 B2 | 1/2017 | Jang et al. |
| 9,562,420 B2 | 2/2017 | Morris et al. |
| 9,570,945 B2 | 2/2017 | Fischer |
| 9,579,980 B2 | 2/2017 | Cryer et al. |
| 9,587,649 B2 | 3/2017 | Oehring |
| 9,611,728 B2 | 4/2017 | Oehring |
| 9,617,808 B2 | 4/2017 | Liu et al. |
| 9,638,101 B1 | 5/2017 | Crowe et al. |
| 9,638,194 B2 | 5/2017 | Wiegman et al. |
| 9,650,871 B2 | 5/2017 | Oehring et al. |
| 9,656,762 B2 | 5/2017 | Kamath et al. |
| 9,689,316 B1 | 6/2017 | Crom |
| 9,739,130 B2 | 8/2017 | Young |
| 9,764,266 B1 | 9/2017 | Carter |
| 9,777,748 B2 | 10/2017 | Lu et al. |
| 9,803,467 B2 | 10/2017 | Tang et al. |
| 9,803,793 B2 | 10/2017 | Davi et al. |
| 9,809,308 B2 | 11/2017 | Aguilar et al. |
| 9,829,002 B2 | 11/2017 | Crom |
| 9,840,897 B2 | 12/2017 | Larson |
| 9,840,901 B2 | 12/2017 | Oering et al. |
| 9,850,422 B2 | 12/2017 | Lestz et al. |
| 9,856,131 B1 | 1/2018 | Moffitt |
| 9,863,279 B2 | 1/2018 | Laing et al. |
| 9,869,305 B1 | 1/2018 | Crowe et al. |
| 9,879,609 B1 | 1/2018 | Crowe et al. |
| 9,893,500 B2 | 2/2018 | Oehring et al. |
| 9,893,660 B2 | 2/2018 | Peterson et al. |
| 9,920,615 B2 | 3/2018 | Zhang et al. |
| 9,945,365 B2 | 4/2018 | Hernandez et al. |
| 9,964,052 B2 | 5/2018 | Millican et al. |
| 9,970,278 B2 | 5/2018 | Broussard et al. |

(56) References Cited

U.S. PATENT DOCUMENTS

| | | |
|---|---|---|
| 9,981,840 B2 | 5/2018 | Shock |
| 9,995,102 B2 | 6/2018 | Dillie et al. |
| 9,995,218 B2 | 6/2018 | Oehring et al. |
| 10,008,880 B2 | 6/2018 | Vicknair et al. |
| 10,018,096 B2 | 7/2018 | Wallimann et al. |
| 10,020,711 B2 | 7/2018 | Oehring et al. |
| 10,029,289 B2 | 7/2018 | Wendorski et al. |
| 10,030,579 B2 | 7/2018 | Austin et al. |
| 10,036,238 B2 | 7/2018 | Oehring |
| 10,040,541 B2 | 8/2018 | Wilson et al. |
| 10,060,349 B2 | 8/2018 | Álvarez et al. |
| 10,077,933 B2 * | 9/2018 | Nelson .................. F25D 17/067 |
| 10,082,137 B2 | 9/2018 | Graham et al. |
| 10,100,827 B2 | 10/2018 | Devan et al. |
| 10,107,084 B2 | 10/2018 | Coli et al. |
| 10,107,085 B2 | 10/2018 | Coli et al. |
| 10,114,061 B2 | 10/2018 | Frampton et al. |
| 10,119,381 B2 | 11/2018 | Oehring et al. |
| 10,134,257 B2 | 11/2018 | Zhang et al. |
| 10,151,244 B2 | 12/2018 | Giancotti et al. |
| 10,174,599 B2 | 1/2019 | Shampine et al. |
| 10,184,397 B2 | 1/2019 | Austin et al. |
| 10,196,258 B2 | 2/2019 | Kalala et al. |
| 10,221,856 B2 | 3/2019 | Hernandez et al. |
| 10,227,854 B2 | 3/2019 | Glass |
| 10,227,855 B2 | 3/2019 | Coli et al. |
| 10,246,984 B2 | 4/2019 | Payne et al. |
| 10,247,182 B2 | 4/2019 | Zhang et al. |
| 10,254,732 B2 | 4/2019 | Oehring et al. |
| 10,267,439 B2 | 4/2019 | Pryce et al. |
| 10,280,724 B2 | 5/2019 | Hinderliter |
| 10,287,943 B1 | 5/2019 | Schiltz |
| 10,303,190 B2 | 5/2019 | Shock |
| 10,316,832 B2 | 6/2019 | Byrne |
| 10,317,875 B2 | 6/2019 | Pandurangan |
| 10,337,402 B2 | 7/2019 | Austin et al. |
| 10,358,035 B2 | 7/2019 | Cryer |
| 10,371,012 B2 | 8/2019 | Davis et al. |
| 10,374,485 B2 | 8/2019 | Morris et al. |
| 10,378,326 B2 | 8/2019 | Morris et al. |
| 10,393,108 B2 | 8/2019 | Chong et al. |
| 10,407,990 B2 | 9/2019 | Oehring et al. |
| 10,408,031 B2 | 9/2019 | Oehring et al. |
| 10,415,348 B2 | 9/2019 | Zhang et al. |
| 10,415,557 B1 | 9/2019 | Crowe et al. |
| 10,415,562 B2 | 9/2019 | Kajita et al. |
| RE47,695 E | 11/2019 | Case et al. |
| 10,465,689 B2 | 11/2019 | Crom |
| 10,526,882 B2 | 1/2020 | Oehring et al. |
| 10,563,649 B2 | 2/2020 | Zhang et al. |
| 10,577,910 B2 | 3/2020 | Stephenson |
| 10,598,258 B2 | 3/2020 | Oehring et al. |
| 10,610,842 B2 | 4/2020 | Chong |
| 10,711,787 B1 | 7/2020 | Darley |
| 10,738,580 B1 | 8/2020 | Fischer et al. |
| 10,753,153 B1 | 8/2020 | Fischer et al. |
| 10,753,165 B1 | 8/2020 | Fischer et al. |
| 10,794,165 B2 | 10/2020 | Fischer et al. |
| 10,794,166 B2 | 10/2020 | Reckels et al. |
| 10,801,311 B1 | 10/2020 | Cui et al. |
| 10,815,764 B1 | 10/2020 | Yeung et al. |
| 10,815,978 B2 | 10/2020 | Glass |
| 10,830,032 B1 | 11/2020 | Zhang et al. |
| 10,865,624 B1 | 12/2020 | Cui et al. |
| 10,865,631 B1 | 12/2020 | Zhang et al. |
| 10,907,459 B1 | 2/2021 | Yeung et al. |
| 2004/0016245 A1 | 1/2004 | Pierson |
| 2004/0187950 A1 | 9/2004 | Cohen et al. |
| 2005/0139286 A1 | 6/2005 | Poulter |
| 2005/0226754 A1 | 10/2005 | Orr et al. |
| 2006/0260331 A1 | 11/2006 | Andreychuk |
| 2007/0029090 A1 | 2/2007 | Andreychuk et al. |
| 2007/0066406 A1 | 3/2007 | Keller et al. |
| 2007/0107981 A1 | 5/2007 | Sicotte |
| 2007/0181212 A1 | 8/2007 | Fell |
| 2007/0277982 A1 | 12/2007 | Shampine et al. |
| 2007/0295569 A1 | 12/2007 | Manzoor et al. |
| 2008/0098891 A1 | 5/2008 | Feher |
| 2008/0161974 A1 | 7/2008 | Alston |
| 2008/0264625 A1 | 10/2008 | Ochoa |
| 2008/0264649 A1 | 10/2008 | Crawford |
| 2009/0064685 A1 | 3/2009 | Busekros et al. |
| 2009/0124191 A1 | 5/2009 | Van Becelaere et al. |
| 2010/0071899 A1 | 3/2010 | Coquilleau et al. |
| 2010/0218508 A1 | 9/2010 | Brown et al. |
| 2010/0300683 A1 | 12/2010 | Looper et al. |
| 2010/0310384 A1 | 12/2010 | Stephenson et al. |
| 2011/0054704 A1 | 3/2011 | Karpman et al. |
| 2011/0085924 A1 | 4/2011 | Shampine et al. |
| 2011/0197988 A1 | 8/2011 | Van Vliet et al. |
| 2011/0241888 A1 | 10/2011 | Lu et al. |
| 2011/0265443 A1 | 11/2011 | Ansari |
| 2011/0272158 A1 | 11/2011 | Neal |
| 2012/0048242 A1 | 3/2012 | Surnilla et al. |
| 2012/0199001 A1 | 8/2012 | Chillar et al. |
| 2012/0310509 A1 | 12/2012 | Pardo et al. |
| 2013/0068307 A1 | 3/2013 | Hains et al. |
| 2013/0087945 A1 | 4/2013 | Kusters et al. |
| 2013/0284455 A1 | 10/2013 | Kajaria et al. |
| 2013/0300341 A1 | 11/2013 | Gillette |
| 2013/0306322 A1 | 11/2013 | Sanborn |
| 2014/0013768 A1 | 1/2014 | Laing et al. |
| 2014/0044517 A1 | 2/2014 | Saha et al. |
| 2014/0048253 A1 | 2/2014 | Andreychuk |
| 2014/0090742 A1 | 4/2014 | Coskrey et al. |
| 2014/0123621 A1 * | 5/2014 | Driessens .............. B01D 46/12 60/39.092 |
| 2014/0130422 A1 | 5/2014 | Laing et al. |
| 2014/0147291 A1 | 5/2014 | Burnette |
| 2014/0277772 A1 | 9/2014 | Lopez et al. |
| 2014/0290266 A1 | 10/2014 | Veilleux, Jr. et al. |
| 2014/0318638 A1 | 10/2014 | Harwood et al. |
| 2015/0078924 A1 | 3/2015 | Zhang et al. |
| 2015/0101344 A1 | 4/2015 | Jarrier et al. |
| 2015/0114652 A1 | 4/2015 | Lestz et al. |
| 2015/0135659 A1 | 5/2015 | Jarrier et al. |
| 2015/0159553 A1 | 6/2015 | Kippel et al. |
| 2015/0192117 A1 | 7/2015 | Bridges |
| 2015/0204148 A1 | 7/2015 | Liu et al. |
| 2015/0204322 A1 | 7/2015 | Iund et al. |
| 2015/0211512 A1 | 7/2015 | Wiegman et al. |
| 2015/0217672 A1 | 8/2015 | Shampine et al. |
| 2015/0275891 A1 | 10/2015 | Chong et al. |
| 2015/0369351 A1 | 12/2015 | Hermann et al. |
| 2016/0032703 A1 | 2/2016 | Broussard et al. |
| 2016/0102581 A1 | 4/2016 | Del Bono |
| 2016/0105022 A1 | 4/2016 | Oehring et al. |
| 2016/0108713 A1 | 4/2016 | Dunaeva et al. |
| 2016/0177675 A1 | 6/2016 | Morris et al. |
| 2016/0186671 A1 | 6/2016 | Austin et al. |
| 2016/0215774 A1 | 7/2016 | Oklejas et al. |
| 2016/0230525 A1 | 8/2016 | Lestz et al. |
| 2016/0244314 A1 | 8/2016 | Van Vliet et al. |
| 2016/0248230 A1 | 8/2016 | Tawy et al. |
| 2016/0253634 A1 | 9/2016 | Thomeer et al. |
| 2016/0273346 A1 | 9/2016 | Tang et al. |
| 2016/0290114 A1 | 10/2016 | Oehring et al. |
| 2016/0319650 A1 | 11/2016 | Oehring et al. |
| 2016/0348479 A1 | 12/2016 | Oehring et al. |
| 2016/0369609 A1 | 12/2016 | Morris et al. |
| 2017/0009905 A1 | 1/2017 | Arnold |
| 2017/0016433 A1 | 1/2017 | Chong et al. |
| 2017/0030177 A1 | 2/2017 | Oehring et al. |
| 2017/0038137 A1 | 2/2017 | Turney |
| 2017/0074076 A1 | 3/2017 | Joseph et al. |
| 2017/0082110 A1 | 3/2017 | Lammers |
| 2017/0089189 A1 | 3/2017 | Norris et al. |
| 2017/0145918 A1 | 5/2017 | Oehring et al. |
| 2017/0218727 A1 | 8/2017 | Oehring et al. |
| 2017/0226839 A1 | 8/2017 | Broussard et al. |
| 2017/0227002 A1 | 8/2017 | Mikulski et al. |
| 2017/0234165 A1 | 8/2017 | Kersey et al. |
| 2017/0234308 A1 | 8/2017 | Buckley |
| 2017/0248034 A1 | 8/2017 | Dzieciol et al. |

(56) References Cited

U.S. PATENT DOCUMENTS

| | | |
|---|---|---|
| 2017/0275149 A1 | 9/2017 | Schmidt |
| 2017/0292409 A1 | 10/2017 | Aguilar et al. |
| 2017/0302135 A1 | 10/2017 | Cory |
| 2017/0305736 A1 | 10/2017 | Haile et al. |
| 2017/0334448 A1 | 11/2017 | Schwunk |
| 2017/0350471 A1 | 12/2017 | Steidl et al. |
| 2017/0370199 A1 | 12/2017 | Witkowski et al. |
| 2018/0034280 A1 | 2/2018 | Pedersen |
| 2018/0038328 A1 | 2/2018 | Louven et al. |
| 2018/0041093 A1 | 2/2018 | Miranda |
| 2018/0045202 A1 | 2/2018 | Crom |
| 2018/0038216 A1 | 3/2018 | Zhang et al. |
| 2018/0058171 A1 | 3/2018 | Roesner et al. |
| 2018/0156210 A1 | 6/2018 | Oehring et al. |
| 2018/0172294 A1 | 6/2018 | Owen |
| 2018/0183219 A1 | 6/2018 | Oehring et al. |
| 2018/0186442 A1 | 7/2018 | Maier |
| 2018/0187662 A1 | 7/2018 | Hill et al. |
| 2018/0223640 A1 | 8/2018 | Keihany et al. |
| 2018/0224044 A1 | 8/2018 | Penney |
| 2018/0229998 A1 | 8/2018 | Shock |
| 2018/0258746 A1 | 9/2018 | Broussard et al. |
| 2018/0266412 A1 | 9/2018 | Stokkevag et al. |
| 2018/0278124 A1 | 9/2018 | Oehring et al. |
| 2018/0283102 A1 | 10/2018 | Cook |
| 2018/0283618 A1 | 10/2018 | Cook |
| 2018/0284817 A1 | 10/2018 | Cook et al. |
| 2018/0291781 A1 | 10/2018 | Pedrini |
| 2018/0298731 A1 | 10/2018 | Bishop |
| 2018/0298735 A1 | 10/2018 | Conrad |
| 2018/0307255 A1 | 10/2018 | Bishop |
| 2018/0328157 A1 | 11/2018 | Bishop |
| 2018/0334893 A1 | 11/2018 | Oehring |
| 2018/0363435 A1 | 12/2018 | Coli et al. |
| 2018/0363436 A1 | 12/2018 | Coli et al. |
| 2018/0363437 A1 | 12/2018 | Coli et al. |
| 2018/0363438 A1 | 12/2018 | Coli et al. |
| 2019/0003272 A1 | 1/2019 | Morris et al. |
| 2019/0003329 A1 | 1/2019 | Morris et al. |
| 2019/0010793 A1 | 1/2019 | Hinderliter |
| 2019/0063341 A1 | 2/2019 | Davis |
| 2019/0067991 A1* | 2/2019 | Davis .................... H02J 3/38 |
| 2019/0071992 A1 | 3/2019 | Feng |
| 2019/0072005 A1 | 3/2019 | Fisher et al. |
| 2019/0078471 A1 | 3/2019 | Braglia et al. |
| 2019/0091619 A1 | 3/2019 | Huang |
| 2019/0106316 A1 | 4/2019 | Van Vliet et al. |
| 2019/0106970 A1 | 4/2019 | Oehring |
| 2019/0112908 A1 | 4/2019 | Coli et al. |
| 2019/0112910 A1 | 4/2019 | Oehring et al. |
| 2019/0119096 A1 | 4/2019 | Haile et al. |
| 2019/0120024 A1 | 4/2019 | Oehring et al. |
| 2019/0120031 A1 | 4/2019 | Gilje |
| 2019/0120134 A1 | 4/2019 | Goleczka et al. |
| 2019/0128247 A1 | 5/2019 | Douglas, III |
| 2019/0131607 A1 | 5/2019 | Gillette |
| 2019/0136677 A1 | 5/2019 | Shampine et al. |
| 2019/0153843 A1 | 5/2019 | Headrick et al. |
| 2019/0154020 A1 | 5/2019 | Glass |
| 2019/0264667 A1 | 5/2019 | Byrne |
| 2019/0178234 A1 | 6/2019 | Beisel |
| 2019/0178235 A1 | 6/2019 | Coskrey et al. |
| 2019/0185312 A1 | 6/2019 | Bush et al. |
| 2019/0203572 A1 | 7/2019 | Morris et al. |
| 2019/0204021 A1 | 7/2019 | Morris et al. |
| 2019/0217258 A1 | 7/2019 | Bishop |
| 2019/0226317 A1 | 7/2019 | Payne et al. |
| 2019/0245348 A1 | 8/2019 | Hinderliter et al. |
| 2019/0249652 A1 | 8/2019 | Stephenson et al. |
| 2019/0249754 A1 | 8/2019 | Oehring et al. |
| 2019/0257297 A1 | 8/2019 | Botting et al. |
| 2019/0277295 A1 | 9/2019 | Clyburn et al. |
| 2019/0316447 A1 | 10/2019 | Oehring et al. |
| 2019/0316456 A1 | 10/2019 | Beisel et al. |
| 2019/0323337 A1 | 10/2019 | Glass et al. |
| 2019/0330923 A1 | 10/2019 | Gable et al. |
| 2019/0331117 A1 | 10/2019 | Gable et al. |
| 2019/0338762 A1 | 11/2019 | Curry et al. |
| 2019/0345920 A1 | 11/2019 | Surjaatmadja et al. |
| 2019/0356199 A1 | 11/2019 | Morris et al. |
| 2020/0003205 A1 | 1/2020 | Stokkevag et al. |
| 2020/0040878 A1 | 2/2020 | Morris |
| 2020/0049136 A1 | 2/2020 | Stephenson |
| 2020/0049153 A1 | 2/2020 | Headrick et al. |
| 2020/0071998 A1 | 3/2020 | Oehring et al. |
| 2020/0088202 A1 | 3/2020 | Sigmar et al. |
| 2020/0095854 A1 | 3/2020 | Hinderliter |
| 2020/0132058 A1 | 4/2020 | Mollatt |
| 2020/0141219 A1 | 5/2020 | Oehring et al. |
| 2020/0141907 A1 | 5/2020 | Meck et al. |
| 2020/0166026 A1 | 5/2020 | Marica |
| 2020/0206704 A1 | 7/2020 | Chong |
| 2020/0224645 A1 | 7/2020 | Buckley |
| 2020/0256333 A1 | 8/2020 | Surjaatmadja |
| 2020/0263498 A1 | 8/2020 | Fischer et al. |
| 2020/0263525 A1 | 8/2020 | Reid |
| 2020/0263526 A1 | 8/2020 | Fischer et al. |
| 2020/0263527 A1 | 8/2020 | Fischer et al. |
| 2020/0263528 A1 | 8/2020 | Fischer et al. |
| 2020/0309113 A1 | 10/2020 | Hunter et al. |
| 2020/0325752 A1 | 10/2020 | Clark et al. |
| 2020/0325760 A1 | 10/2020 | Markham |
| 2020/0325761 A1 | 10/2020 | Williams |
| 2020/0332784 A1 | 10/2020 | Zhang et al. |
| 2020/0332788 A1 | 10/2020 | Cui et al. |
| 2020/0340313 A1 | 10/2020 | Fischer et al. |
| 2020/0340340 A1 | 10/2020 | Oehring et al. |
| 2020/0340344 A1 | 10/2020 | Reckels et al. |
| 2020/0340404 A1 | 10/2020 | Stockstill |
| 2020/0347725 A1* | 11/2020 | Morris .................... F02C 6/00 |
| 2020/0392826 A1 | 12/2020 | Cui et al. |
| 2020/0398238 A1 | 12/2020 | Zhong et al. |
| 2020/0400000 A1 | 12/2020 | Ghasripoor et al. |
| 2020/0400005 A1 | 12/2020 | Han et al. |
| 2020/0408071 A1 | 12/2020 | Li et al. |
| 2020/0408144 A1 | 12/2020 | Feng et al. |
| 2020/0408147 A1* | 12/2020 | Zhang .................... F02C 6/00 |

FOREIGN PATENT DOCUMENTS

| | | |
|---|---|---|
| CA | 2876687 C | 4/2019 |
| CN | 2779054 | 5/2006 |
| CN | 2890325 | 4/2007 |
| CN | 200964929 Y | 10/2007 |
| CN | 101323151 A | 12/2008 |
| CN | 201190660 Y | 2/2009 |
| CN | 201190892 Y | 2/2009 |
| CN | 201190893 Y | 2/2009 |
| CN | 101414171 A | 4/2009 |
| CN | 201215073 Y | 4/2009 |
| CN | 201236650 Y | 5/2009 |
| CN | 201275542 Y | 7/2009 |
| CN | 201275801 Y | 7/2009 |
| CN | 201333385 Y | 10/2009 |
| CN | 201443300 U | 4/2010 |
| CN | 201496415 U | 6/2010 |
| CN | 201501365 U | 6/2010 |
| CN | 201507271 U | 6/2010 |
| CN | 101323151 B | 7/2010 |
| CN | 201560210 U | 8/2010 |
| CN | 201581862 U | 9/2010 |
| CN | 201610728 U | 10/2010 |
| CN | 201610751 U | 10/2010 |
| CN | 201618530 U | 11/2010 |
| CN | 201661255 U | 12/2010 |
| CN | 101949382 | 1/2011 |
| CN | 201756927 U | 3/2011 |
| CN | 101414171 B | 5/2011 |
| CN | 102128011 A | 7/2011 |
| CN | 102140898 A | 8/2011 |
| CN | 102155172 A | 8/2011 |
| CN | 202000930 U | 10/2011 |
| CN | 202055781 U | 11/2011 |
| CN | 202082265 U | 12/2011 |

(56) References Cited

FOREIGN PATENT DOCUMENTS

| | | |
|---|---|---|
| CN | 202100216 U | 1/2012 |
| CN | 202100217 U | 1/2012 |
| CN | 202100815 U | 1/2012 |
| CN | 202124340 U | 1/2012 |
| CN | 202140051 U | 2/2012 |
| CN | 202140080 U | 2/2012 |
| CN | 202144789 U | 2/2012 |
| CN | 202144943 U | 2/2012 |
| CN | 202149354 U | 2/2012 |
| CN | 102383748 A | 3/2012 |
| CN | 202156297 U | 3/2012 |
| CN | 202158355 U | 3/2012 |
| CN | 202163504 U | 3/2012 |
| CN | 202165236 U | 3/2012 |
| CN | 202180866 U | 4/2012 |
| CN | 202181875 U | 4/2012 |
| CN | 202187744 U | 4/2012 |
| CN | 202191854 U | 4/2012 |
| CN | 202250008 U | 5/2012 |
| CN | 101885307 | 7/2012 |
| CN | 102562020 A | 7/2012 |
| CN | 202326156 U | 7/2012 |
| CN | 202370773 U | 8/2012 |
| CN | 202417397 U | 9/2012 |
| CN | 202417461 U | 9/2012 |
| CN | 102729335 A | 10/2012 |
| CN | 202463955 U | 10/2012 |
| CN | 202463957 U | 10/2012 |
| CN | 202467739 U | 10/2012 |
| CN | 202467801 U | 10/2012 |
| CN | 202531016 U | 11/2012 |
| CN | 202544794 U | 11/2012 |
| CN | 102825039 A | 12/2012 |
| CN | 202578592 U | 12/2012 |
| CN | 202579164 U | 12/2012 |
| CN | 202594808 U | 12/2012 |
| CN | 202594928 U | 12/2012 |
| CN | 202596615 U | 12/2012 |
| CN | 202596616 U | 12/2012 |
| CN | 102849880 A | 1/2013 |
| CN | 102889191 A | 1/2013 |
| CN | 202641535 U | 1/2013 |
| CN | 202645475 U | 1/2013 |
| CN | 202666716 U | 1/2013 |
| CN | 202669645 U | 1/2013 |
| CN | 202669944 U | 1/2013 |
| CN | 202671336 U | 1/2013 |
| CN | 202673269 U | 1/2013 |
| CN | 202751982 U | 2/2013 |
| CN | 102963629 A | 3/2013 |
| CN | 202767964 U | 3/2013 |
| CN | 202789791 U | 3/2013 |
| CN | 202789792 U | 3/2013 |
| CN | 202810717 U | 3/2013 |
| CN | 202827276 U | 3/2013 |
| CN | 202833093 U | 3/2013 |
| CN | 202833370 U | 3/2013 |
| CN | 102140898 B | 4/2013 |
| CN | 202895467 U | 4/2013 |
| CN | 202935798 U | 5/2013 |
| CN | 202935816 U | 5/2013 |
| CN | 202970631 U | 6/2013 |
| CN | 103223315 A | 7/2013 |
| CN | 203050598 U | 7/2013 |
| CN | 103233714 A | 8/2013 |
| CN | 103233715 A | 8/2013 |
| CN | 103245523 A | 8/2013 |
| CN | 103247220 A | 8/2013 |
| CN | 103253839 A | 8/2013 |
| CN | 103277290 A | 9/2013 |
| CN | 103321782 A | 9/2013 |
| CN | 203170270 U | 9/2013 |
| CN | 203172509 U | 9/2013 |
| CN | 203175778 U | 9/2013 |
| CN | 203175787 U | 9/2013 |
| CN | 102849880 B | 10/2013 |
| CN | 203241231 U | 10/2013 |
| CN | 203244941 U | 10/2013 |
| CN | 203244942 U | 10/2013 |
| CN | 203303798 U | 11/2013 |
| CN | 102155172 B | 12/2013 |
| CN | 102729335 B | 12/2013 |
| CN | 103420532 A | 12/2013 |
| CN | 203321792 U | 12/2013 |
| CN | 203412658 | 1/2014 |
| CN | 203420697 U | 2/2014 |
| CN | 203480755 U | 3/2014 |
| CN | 103711437 A | 4/2014 |
| CN | 203531815 U | 4/2014 |
| CN | 203531871 U | 4/2014 |
| CN | 203531883 U | 4/2014 |
| CN | 203556164 U | 4/2014 |
| CN | 203558809 U | 4/2014 |
| CN | 203559861 U | 4/2014 |
| CN | 203559893 U | 4/2014 |
| CN | 203560189 U | 4/2014 |
| CN | 102704870 B | 5/2014 |
| CN | 203611843 U | 5/2014 |
| CN | 203612531 U | 5/2014 |
| CN | 203612843 U | 5/2014 |
| CN | 203614062 U | 5/2014 |
| CN | 203614388 U | 5/2014 |
| CN | 203621045 U | 6/2014 |
| CN | 203621046 U | 6/2014 |
| CN | 203621051 U | 6/2014 |
| CN | 203640993 U | 6/2014 |
| CN | 203655221 U | 6/2014 |
| CN | 103899280 A | 7/2014 |
| CN | 103923670 A | 7/2014 |
| CN | 203685052 U | 7/2014 |
| CN | 203716936 U | 7/2014 |
| CN | 103990410 A | 8/2014 |
| CN | 103993869 A | 8/2014 |
| CN | 203754009 U | 8/2014 |
| CN | 203754025 U | 8/2014 |
| CN | 203754341 U | 8/2014 |
| CN | 203756614 U | 8/2014 |
| CN | 203770264 U | 8/2014 |
| CN | 203784519 U | 8/2014 |
| CN | 203784520 U | 8/2014 |
| CN | 104057864 A | 9/2014 |
| CN | 203819819 U | 9/2014 |
| CN | 203823431 U | 9/2014 |
| CN | 203835337 U | 9/2014 |
| CN | 104074500 A | 10/2014 |
| CN | 203876633 U | 10/2014 |
| CN | 203876636 U | 10/2014 |
| CN | 203877364 U | 10/2014 |
| CN | 203877365 U | 10/2014 |
| CN | 203877375 U | 10/2014 |
| CN | 203877424 U | 10/2014 |
| CN | 203879476 U | 10/2014 |
| CN | 203879479 U | 10/2014 |
| CN | 203890292 U | 10/2014 |
| CN | 203899476 U | 10/2014 |
| CN | 203906206 U | 10/2014 |
| CN | 104150728 A | 11/2014 |
| CN | 104176522 A | 12/2014 |
| CN | 104196464 A | 12/2014 |
| CN | 104234651 A | 12/2014 |
| CN | 203971841 U | 12/2014 |
| CN | 203975450 U | 12/2014 |
| CN | 204020788 U | 12/2014 |
| CN | 204021980 U | 12/2014 |
| CN | 204024625 U | 12/2014 |
| CN | 204051401 U | 12/2014 |
| CN | 204060661 U | 12/2014 |
| CN | 104260672 A | 1/2015 |
| CN | 104314512 A | 1/2015 |
| CN | 204077478 U | 1/2015 |
| CN | 204077526 U | 1/2015 |
| CN | 204078307 U | 1/2015 |
| CN | 204083051 U | 1/2015 |
| CN | 204113168 U | 1/2015 |

(56) References Cited

FOREIGN PATENT DOCUMENTS

| | | | |
|---|---|---|---|
| CN | 104340682 | A | 2/2015 |
| CN | 104358536 | A | 2/2015 |
| CN | 104369687 | A | 2/2015 |
| CN | 104402178 | A | 3/2015 |
| CN | 104402185 | A | 3/2015 |
| CN | 104402186 | A | 3/2015 |
| CN | 204209819 | U | 3/2015 |
| CN | 204224560 | U | 3/2015 |
| CN | 204225813 | U | 3/2015 |
| CN | 204225839 | U | 3/2015 |
| CN | 104533392 | A | 4/2015 |
| CN | 104563938 | A | 4/2015 |
| CN | 104563994 | A | 4/2015 |
| CN | 104563995 | A | 4/2015 |
| CN | 104563998 | A | 4/2015 |
| CN | 104564033 | A | 4/2015 |
| CN | 204257122 | U | 4/2015 |
| CN | 204283610 | U | 4/2015 |
| CN | 204283782 | U | 4/2015 |
| CN | 204297682 | U | 4/2015 |
| CN | 204299810 | U | 4/2015 |
| CN | 103223315 | B | 5/2015 |
| CN | 104594857 | A | 5/2015 |
| CN | 104595493 | A | 5/2015 |
| CN | 104612647 | A | 5/2015 |
| CN | 104612928 | A | 5/2015 |
| CN | 104632126 | A | 5/2015 |
| CN | 204325094 | U | 5/2015 |
| CN | 204325098 | U | 5/2015 |
| CN | 204326983 | U | 5/2015 |
| CN | 204326985 | U | 5/2015 |
| CN | 204344040 | U | 5/2015 |
| CN | 204344095 | U | 5/2015 |
| CN | 104727797 | A | 6/2015 |
| CN | 204402414 | U | 6/2015 |
| CN | 204402423 | U | 6/2015 |
| CN | 204402450 | U | 6/2015 |
| CN | 103247220 | B | 7/2015 |
| CN | 104803568 | A | 7/2015 |
| CN | 204436360 | U | 7/2015 |
| CN | 204457524 | U | 7/2015 |
| CN | 204472485 | U | 7/2015 |
| CN | 204473625 | U | 7/2015 |
| CN | 204477303 | U | 7/2015 |
| CN | 204493095 | U | 7/2015 |
| CN | 204493309 | U | 7/2015 |
| CN | 103253839 | B | 8/2015 |
| CN | 104820372 | A | 8/2015 |
| CN | 104832093 | A | 8/2015 |
| CN | 104863523 | A | 8/2015 |
| CN | 204552723 | U | 8/2015 |
| CN | 204553866 | U | 8/2015 |
| CN | 204571831 | U | 8/2015 |
| CN | 204703814 | U | 10/2015 |
| CN | 204703833 | U | 10/2015 |
| CN | 204703834 | U | 10/2015 |
| CN | 105092401 | A | 11/2015 |
| CN | 103233715 | B | 12/2015 |
| CN | 103790927 | | 12/2015 |
| CN | 105207097 | | 12/2015 |
| CN | 204831952 | U | 12/2015 |
| CN | 204899777 | U | 12/2015 |
| CN | 102602323 | | 1/2016 |
| CN | 105240064 | A | 1/2016 |
| CN | 204944834 | | 1/2016 |
| CN | 205042127 | U | 2/2016 |
| CN | 205172478 | U | 4/2016 |
| CN | 103993869 | B | 5/2016 |
| CN | 105536299 | A | 5/2016 |
| CN | 105545207 | A | 5/2016 |
| CN | 205260249 | | 5/2016 |
| CN | 103233714 | B | 6/2016 |
| CN | 104340682 | B | 6/2016 |
| CN | 205297518 | U | 6/2016 |
| CN | 205298447 | U | 6/2016 |
| CN | 205391821 | U | 7/2016 |
| CN | 205400701 | U | 7/2016 |
| CN | 103277290 | B | 8/2016 |
| CN | 104260672 | B | 8/2016 |
| CN | 205477370 | U | 8/2016 |
| CN | 205479153 | U | 8/2016 |
| CN | 205503058 | U | 8/2016 |
| CN | 205503068 | U | 8/2016 |
| CN | 205503089 | U | 8/2016 |
| CN | 105958098 | A | 9/2016 |
| CN | 205599180 | | 9/2016 |
| CN | 205599180 | U | 9/2016 |
| CN | 106121577 | A | 11/2016 |
| CN | 205709587 | | 11/2016 |
| CN | 104612928 | B | 12/2016 |
| CN | 106246120 | A | 12/2016 |
| CN | 205805471 | | 12/2016 |
| CN | 106321045 | A | 1/2017 |
| CN | 205858306 | | 1/2017 |
| CN | 106438310 | A | 2/2017 |
| CN | 205937833 | | 2/2017 |
| CN | 104563994 | B | 3/2017 |
| CN | 206129196 | | 4/2017 |
| CN | 104369687 | B | 5/2017 |
| CN | 106715165 | | 5/2017 |
| CN | 106761561 | A | 5/2017 |
| CN | 105240064 | B | 6/2017 |
| CN | 206237147 | | 6/2017 |
| CN | 206287832 | | 6/2017 |
| CN | 206346711 | | 7/2017 |
| CN | 104563995 | B | 9/2017 |
| CN | 107120822 | | 9/2017 |
| CN | 107143298 | A | 9/2017 |
| CN | 107159046 | U | 9/2017 |
| CN | 107188018 | A | 9/2017 |
| CN | 206496016 | | 9/2017 |
| CN | 104564033 | B | 10/2017 |
| CN | 107234358 | A | 10/2017 |
| CN | 107261975 | A | 10/2017 |
| CN | 206581929 | | 10/2017 |
| CN | 104820372 | B | 12/2017 |
| CN | 105092401 | B | 12/2017 |
| CN | 107476769 | A | 12/2017 |
| CN | 107520526 | A | 12/2017 |
| CN | 206754664 | | 12/2017 |
| CN | 107605427 | A | 1/2018 |
| CN | 106438310 | B | 2/2018 |
| CN | 107654196 | A | 2/2018 |
| CN | 107656499 | A | 2/2018 |
| CN | 107728657 | A | 2/2018 |
| CN | 206985503 | | 2/2018 |
| CN | 207017968 | | 2/2018 |
| CN | 107859053 | A | 3/2018 |
| CN | 207057867 | | 3/2018 |
| CN | 207085817 | | 3/2018 |
| CN | 105545207 | B | 4/2018 |
| CN | 107883091 | A | 4/2018 |
| CN | 107902427 | A | 4/2018 |
| CN | 107939290 | A | 4/2018 |
| CN | 107956708 | | 4/2018 |
| CN | 207169595 | | 4/2018 |
| CN | 207194873 | | 4/2018 |
| CN | 207245674 | | 4/2018 |
| CN | 108034466 | A | 5/2018 |
| CN | 108036071 | A | 5/2018 |
| CN | 108087050 | A | 5/2018 |
| CN | 207380566 | | 5/2018 |
| CN | 108103483 | A | 6/2018 |
| CN | 108179046 | A | 6/2018 |
| CN | 108254276 | A | 7/2018 |
| CN | 108311535 | A | 7/2018 |
| CN | 207583576 | | 7/2018 |
| CN | 207634064 | | 7/2018 |
| CN | 207648054 | | 7/2018 |
| CN | 207650621 | | 7/2018 |
| CN | 108371894 | A | 8/2018 |
| CN | 207777153 | | 8/2018 |
| CN | 108547601 | A | 9/2018 |
| CN | 108547766 | A | 9/2018 |

(56) References Cited

FOREIGN PATENT DOCUMENTS

| | | | |
|---|---|---|---|
| CN | 108555826 A | 9/2018 |
| CN | 108561098 A | 9/2018 |
| CN | 108561750 A | 9/2018 |
| CN | 108590617 A | 9/2018 |
| CN | 207813495 | 9/2018 |
| CN | 207814698 | 9/2018 |
| CN | 207862275 | 9/2018 |
| CN | 108687954 A | 10/2018 |
| CN | 207935270 | 10/2018 |
| CN | 207961582 | 10/2018 |
| CN | 207964530 | 10/2018 |
| CN | 108789848 A | 11/2018 |
| CN | 108868675 A | 11/2018 |
| CN | 208086829 | 11/2018 |
| CN | 208089263 | 11/2018 |
| CN | 108979569 A | 12/2018 |
| CN | 109027662 A | 12/2018 |
| CN | 109058092 A | 12/2018 |
| CN | 208179454 | 12/2018 |
| CN | 208179502 | 12/2018 |
| CN | 208260574 | 12/2018 |
| CN | 109114418 A | 1/2019 |
| CN | 109141990 A | 1/2019 |
| CN | 208313120 | 1/2019 |
| CN | 208330319 | 1/2019 |
| CN | 208342730 | 1/2019 |
| CN | 208430982 | 1/2019 |
| CN | 208430986 | 1/2019 |
| CN | 109404274 A | 3/2019 |
| CN | 109429610 A | 3/2019 |
| CN | 109491318 A | 3/2019 |
| CN | 109515177 A | 3/2019 |
| CN | 109526523 A | 3/2019 |
| CN | 109534737 A | 3/2019 |
| CN | 208564504 | 3/2019 |
| CN | 208564516 | 3/2019 |
| CN | 208564525 | 3/2019 |
| CN | 208564918 | 3/2019 |
| CN | 208576026 | 3/2019 |
| CN | 208576042 | 3/2019 |
| CN | 208650818 | 3/2019 |
| CN | 208669244 | 3/2019 |
| CN | 109555484 A | 4/2019 |
| CN | 109682881 A | 4/2019 |
| CN | 208730959 | 4/2019 |
| CN | 208735264 | 4/2019 |
| CN | 208746733 | 4/2019 |
| CN | 208749529 | 4/2019 |
| CN | 208750405 | 4/2019 |
| CN | 208764658 | 4/2019 |
| CN | 109736740 A | 5/2019 |
| CN | 109751007 A | 5/2019 |
| CN | 208868428 | 5/2019 |
| CN | 208870761 | 5/2019 |
| CN | 109869294 A | 6/2019 |
| CN | 109882144 A | 6/2019 |
| CN | 109882372 A | 6/2019 |
| CN | 209012047 | 6/2019 |
| CN | 209100025 | 7/2019 |
| CN | 110080707 A | 8/2019 |
| CN | 110118127 A | 8/2019 |
| CN | 110124574 A | 8/2019 |
| CN | 110145277 A | 8/2019 |
| CN | 110145399 A | 8/2019 |
| CN | 110152552 A | 8/2019 |
| CN | 110155193 A | 8/2019 |
| CN | 110159225 A | 8/2019 |
| CN | 110159432 | 8/2019 |
| CN | 110159432 A | 8/2019 |
| CN | 110159433 A | 8/2019 |
| CN | 110208100 A | 9/2019 |
| CN | 110252191 A | 9/2019 |
| CN | 110284854 A | 9/2019 |
| CN | 110284972 A | 9/2019 |
| CN | 209387358 | 9/2019 |
| CN | 110374745 A | 10/2019 |
| CN | 209534736 | 10/2019 |
| CN | 110425105 A | 11/2019 |
| CN | 110439779 A | 11/2019 |
| CN | 110454285 A | 11/2019 |
| CN | 110454352 A | 11/2019 |
| CN | 110467298 A | 11/2019 |
| CN | 110469312 A | 11/2019 |
| CN | 110469314 A | 11/2019 |
| CN | 110469405 A | 11/2019 |
| CN | 110469654 A | 11/2019 |
| CN | 110485982 A | 11/2019 |
| CN | 110485983 A | 11/2019 |
| CN | 110485984 A | 11/2019 |
| CN | 110486249 A | 11/2019 |
| CN | 110500255 A | 11/2019 |
| CN | 110510771 A | 11/2019 |
| CN | 110513097 A | 11/2019 |
| CN | 209650738 | 11/2019 |
| CN | 209653968 | 11/2019 |
| CN | 209654004 | 11/2019 |
| CN | 209654022 | 11/2019 |
| CN | 209654128 | 11/2019 |
| CN | 209656622 | 11/2019 |
| CN | 107849130 B | 12/2019 |
| CN | 108087050 B | 12/2019 |
| CN | 110566173 A | 12/2019 |
| CN | 110608030 A | 12/2019 |
| CN | 110617187 A | 12/2019 |
| CN | 110617188 A | 12/2019 |
| CN | 110617318 A | 12/2019 |
| CN | 209740823 | 12/2019 |
| CN | 209780827 | 12/2019 |
| CN | 209798631 | 12/2019 |
| CN | 209799942 | 12/2019 |
| CN | 209800178 | 12/2019 |
| CN | 209855723 | 12/2019 |
| CN | 209855742 | 12/2019 |
| CN | 209875063 | 12/2019 |
| CN | 110656919 A | 1/2020 |
| CN | 107520526 B | 2/2020 |
| CN | 110787667 A | 2/2020 |
| CN | 110821464 A | 2/2020 |
| CN | 110833665 A | 2/2020 |
| CN | 110848028 A | 2/2020 |
| CN | 210049880 | 2/2020 |
| CN | 210049882 | 2/2020 |
| CN | 210097596 | 2/2020 |
| CN | 210105817 | 2/2020 |
| CN | 210105818 | 2/2020 |
| CN | 210105993 | 2/2020 |
| CN | 110873093 A | 3/2020 |
| CN | 210139911 | 3/2020 |
| CN | 110947681 A | 4/2020 |
| CN | 111058810 A | 4/2020 |
| CN | 111075391 A | 4/2020 |
| CN | 210289931 | 4/2020 |
| CN | 210289932 | 4/2020 |
| CN | 210289933 | 4/2020 |
| CN | 210303516 | 4/2020 |
| CN | 211412945 | 4/2020 |
| CN | 111089003 A | 5/2020 |
| CN | 111151186 A | 5/2020 |
| CN | 111167769 A | 5/2020 |
| CN | 111169833 A | 5/2020 |
| CN | 111173476 A | 5/2020 |
| CN | 111185460 A | 5/2020 |
| CN | 111185461 A | 5/2020 |
| CN | 111188763 A | 5/2020 |
| CN | 111206901 A | 5/2020 |
| CN | 111206992 A | 5/2020 |
| CN | 111206994 A | 5/2020 |
| CN | 210449044 | 5/2020 |
| CN | 210460875 | 5/2020 |
| CN | 210522432 | 5/2020 |
| CN | 210598943 | 5/2020 |
| CN | 210598945 | 5/2020 |
| CN | 210598946 | 5/2020 |
| CN | 210599194 | 5/2020 |

(56) References Cited

FOREIGN PATENT DOCUMENTS

| | | |
|---|---|---|
| CN | 210599303 | 5/2020 |
| CN | 210600110 | 5/2020 |
| CN | 111219326 A | 6/2020 |
| CN | 111350595 A | 6/2020 |
| CN | 210660319 | 6/2020 |
| CN | 210714569 | 6/2020 |
| CN | 210769168 | 6/2020 |
| CN | 210769169 | 6/2020 |
| CN | 210769170 | 6/2020 |
| CN | 210770133 | 6/2020 |
| CN | 210825844 | 6/2020 |
| CN | 210888904 | 6/2020 |
| CN | 210888905 | 6/2020 |
| CN | 210889242 | 6/2020 |
| CN | 111397474 A | 7/2020 |
| CN | 111412064 A | 7/2020 |
| CN | 111441923 A | 7/2020 |
| CN | 111441925 A | 7/2020 |
| CN | 111503517 A | 8/2020 |
| CN | 111515898 A | 8/2020 |
| CN | 111594059 A | 8/2020 |
| CN | 111594062 A | 8/2020 |
| CN | 111594144 A | 8/2020 |
| CN | 211201919 | 8/2020 |
| CN | 211201920 | 8/2020 |
| CN | 211202218 | 8/2020 |
| CN | 111608965 A | 9/2020 |
| CN | 111664087 A | 9/2020 |
| CN | 111677476 A | 9/2020 |
| CN | 111677647 A | 9/2020 |
| CN | 111692064 A | 9/2020 |
| CN | 111692065 A | 9/2020 |
| CN | 211384571 | 9/2020 |
| CN | 211397553 | 9/2020 |
| CN | 211397677 | 9/2020 |
| CN | 211500955 | 9/2020 |
| CN | 211524765 | 9/2020 |
| DE | 4241614 | 6/1994 |
| DE | 102012018825 | 3/2014 |
| EP | 0835983 | 4/1998 |
| EP | 1378683 | 1/2004 |
| EP | 2143916 | 1/2010 |
| EP | 2613023 | 7/2013 |
| EP | 3095989 | 11/2016 |
| EP | 3211766 | 8/2017 |
| EP | 3354866 | 8/2018 |
| GB | 1438172 | 6/1976 |
| JP | S57135212 | 2/1984 |
| KR | 20020026398 | 4/2002 |
| RU | 13562 | 4/2000 |
| WO | 1993020328 | 10/1993 |
| WO | 2006025886 | 3/2006 |
| WO | 2009023042 | 2/2009 |
| WO | 2012139380 | 10/2012 |
| WO | 2013185399 | 12/2013 |
| WO | 2015158020 | 10/2015 |
| WO | 2016033983 | 3/2016 |
| WO | 2016078181 | 5/2016 |
| WO | 2016101374 | 6/2016 |
| WO | 2016112590 | 7/2016 |
| WO | 2017213848 | 12/2017 |
| WO | 2018031029 | 2/2018 |
| WO | 2018038710 | 3/2018 |
| WO | 2018044293 | 3/2018 |
| WO | 2018044307 | 3/2018 |
| WO | 2018071738 | 4/2018 |
| WO | 2018101909 | 6/2018 |
| WO | 2018101912 | 6/2018 |
| WO | 2018106210 | 6/2018 |
| WO | 2018106225 | 6/2018 |
| WO | 2018106252 | 6/2018 |
| WO | 2018156131 | 8/2018 |
| WO | 2018075034 | 10/2018 |
| WO | 2018187346 | 10/2018 |
| WO | 2018031031 | 2/2019 |
| WO | 2019045691 | 3/2019 |
| WO | 2019060922 | 3/2019 |
| WO | 2019126742 | 6/2019 |
| WO | 2019147601 | 8/2019 |
| WO | 2019169366 | 9/2019 |
| WO | 2019200510 | 10/2019 |
| WO | 2019210417 | 11/2019 |
| WO | 2020018068 | 1/2020 |
| WO | 2020072076 | 4/2020 |
| WO | 2020104088 | 5/2020 |
| WO | 2020131085 A1 | 6/2020 |
| WO | 2020211083 | 10/2020 |
| WO | 2020211086 | 10/2020 |

OTHER PUBLICATIONS

Filipović, Ivan, Preliminary Selection of Basic Parameters of Different Torsional Vibration Dampers Intended for use in Medium-Speed Diesel Engines, Transactions of Famena XXXVI-3 (2012).
Marine Turbine Technologies, 1 MW Power Generation Package, http://marineturbine.com/power-generation, 2017.
Business Week: Fiber-optic cables help fracking, cablinginstall. com. Jul. 12, 2013. https://www.cablinginstall.com/cable/article/16474208/businessweek-fiberoptic-cables-help-fracking.
Fracking companies switch to electric motors to power pumps, iadd-intl.org. Jun. 27, 2019. https://www.iadd-intl.org/articles/fracking-companies-switch-to-electric-motors-to-power-pumps/.
The Leader in Frac Fueling, suncoastresources.com. Jun. 29, 2015. https://web.archive.org/web/20150629220609/https://www.suncoastresources.com/oilfield/fueling-services/.
Mobile Fuel Delivery, atlasoil.com. Mar. 6, 2019. https://www.atlasoil.com/nationwide-fueling/onsite-and-mobile-fueling.
Frac Tank Hose (FRAC), 4starhose.com. Accessed: Nov. 10, 2019. http://www.4starhose.com/product/frac_tank_hose_frac.aspx.
PLOS ONE, Dynamic Behavior of Reciprocating Plunger Pump Discharge Valve Based on Fluid Structure Interaction and Experimental Analysis. Oct. 21, 2015.
FMC Technologies, Operation and Maintenance Manual, L06 Through L16 Triplex Pumps Doc No. OMM50000903 Rev: E p. 1 of 66. Aug. 27, 2009.
Gardner Denver Hydraulic Fracturing Pumps GD 3000 https://www.gardnerdenver.com/en-us/pumps/triplex-fracking-pump-gd-3000.
Lekontsev, Yu M., et al. "Two-side sealer operation." Journal of Mining Science 49.5 (2013): 757-762.
Tom Hausfeld, GE Power & Water, and Eldon Schelske, Evolution Well Services, TM2500+ Power for Hydraulic Fracturing.
FTS International's Dual Fuel Hydraulic Fracturing Equipment Increases Operational Efficiencies, Provides Cost Benefits, Jan. 3, 2018.
CNG Delivery, Fracturing with natural gas, dual-fuel drilling with CNG, Aug. 22, 2019.
PbNG, Natural Gas Fuel for Drilling and Hydraulic Fracturing, Diesel Displacement / Dual Fuel & Bi-Fuel, May 2014.
Integrated Flow, Skid-mounted Modular Process Systems, https://ifsolutions.com/.
Cameron, A Schlumberger Company, Frac Manifold Systems, 2016.
ZSi-Foster, Energy | Solar | Fracking | Oil and Gas, https://www.zsi-foster.com/energy-solar-fracking-oil-and-gas.html.
JBG Enterprises, Inc., WS-Series Blowout Prevention Safety Coupling—Quick Release Couplings, http://www.jgbhose.com/products/WS-Series-Blowout-Prevention-Safety-Coupling.asp.
Halliburton, Vessel-based Modular Solution (VMS), 2015.
Chun, M. K., H. K. Song, and R. Lallemand. "Heavy duty gas turbines in petrochemical plants: Samsung's Daesan plant (Korea) beats fuel flexibility records with over 95% hydrogen in process gas." Proceedings of PowerGen Asia Conference, Singapore. 1999.
Wolf, Jürgen J., and Marko A. Perkavec. "Safety Aspects and Environmental Considerations for a 10 MW Cogeneration Heavy Duty Gas Turbine Burning Coke Oven Gas with 60% Hydrogen Content." ASME 1992 International Gas Turbine and Aeroengine Congress and Exposition. American Society of Mechanical Engineers Digital Collection, 1992.

(56) References Cited

OTHER PUBLICATIONS

Ginter, Timothy, and Thomas Bouvay. "Uprate options for the MS7001 heavy duty gas turbine." GE paper GER-3808C, GE Energy 12 (2006).

Chaichan, Miqdam Tariq. "The impact of equivalence ratio on performance and emissions of a hydrogen-diesel dual fuel engine with cooled exhaust gas recirculation." International Journal of Scientific & Engineering Research 6.6 (2015): 938-941.

Ecob, David J., et al. "Design and Development of a Landfill Gas Combustion System for the Typhoon Gas Turbine." ASME 1996 International Gas Turbine and Aeroengine Congress and Exhibition. American Society of Mechanical Engineers Digital Collection, 1996.

II-VI Marlow Industries, Thermoelectric Technologies in Oil, Gas, and Mining Industries, blog.marlow.com (Jul. 24, 2019).

B.M. Mahlalela, et al., .Electric Power Generation Potential Based on Waste Heat and Geothermal Resources in South Africa, pangea.stanford.edu (Feb. 11, 2019).

Department of Energy, United States of America, The Water-Energy Nexus: Challenges and Opportunities purenergypolicy.org (Jun. 2014).

Ankit Tiwari, Design of a Cooling System for a Hydraulic Fracturing Equipment, The Pennsylvania State University, The Graduate School, College of Engineering, 2015.

Jp Yadav et al., Power Enhancement of Gas Turbine Plant by Intake Air Fog Cooling, Jun. 2015.

Mee Industries: Inlet Air Fogging Systems for Oil, Gas and Petrochemical Processing, Verdict Media Limited Copyright 2020.

M. Ahmadzadehtalatapeh et al.Performance enhancement of gas turbine units by retrofitting with inlet air cooling technologies (IACTs): an hour-by-hour simulation study, Journal of the Brazilian Society of Mechanical Sciences and Engineering, Mar. 2020.

Advances in Popular Torque-Link Solution Offer OEMs Greater Benefit, Jun. 21, 2018.

Emmanuel Akita et al., Mewbourne College of Earth & Energy, Society of Petroleum Engineers; Drilling Systems Automation Technical Section (DSATS); 2019.

PowerShelter Kit II, nooutage.com, Sep. 6, 2019.

EMPengineering.com, HEMP Resistant Electrical Generators / Hardened Structures HEMP/GMD Shielded Generators, Virginia.

Blago Minovski, Coupled Simulations of Cooling and Engine Systems for Unsteady Analysis of the Benefits of Thermal Engine Encapsulation, Department of Applied Mechanics, Chalmers University of Technology Goteborg, Sweden 2015.

J. Porteiro et al., Feasibility of a new domestic CHP trigeneration with heat pump: II. Availability analysis. Design and development, Applied Thermal Engineering 24 (2004) 1421-1429.

Europump and Hydrualic Institute, Variable Speed Pumping: A Guide to Successful Applications, Elsevier Ltd, 2004.

Capstone Turbine Corporation, Capstone Receives Three Megawatt Order from Large Independent Oil & Gas Company in Eagle Ford Shale Play, Dec. 7, 2010.

Wikipedia, Westinghouse Combustion Turbine Systems Division, https://en.wikipedia.org/wiki/Westinghouse_Combustion_Turbine_Systems_Division, circa 1960.

Wikipedia,Union Pacific GTELs, https://en.wikipedia.org/wiki/Union_Pacific_GTELs, circa 1950.

HCI JET Frac, Screenshots from YouTube, Dec. 11, 2010. https://www.youtube.com/watch?v=6HjXkdbFaFQ.

AFD Petroleum Ltd., Automated Hot Zone, Frac Refueling System, Dec. 2018.

Eygun, Christiane, et al., URTeC: 2687987, Mitigating Shale Gas Developments Carbon Footprint: Evaluating and Implementing Solutions in Argentina, Copyright 2017, Unconventional Resources Technology Conference.

Walzel, Brian, Hart Energy, Oil, Gas Industry Discovers Innovative Solutions to Environmental Concerns, Dec. 10, 2018.

FRAC Shack, Bi-Fuel FracFueller brochure, 2011.

Pettigrew, Dana, et al., High Pressure Multi-Stage Centrifugal Pump for 10,000 psi Frac Pump—HPHPS FRAC Pump, Copyright 2013, Society of Petroleum Engineers, SPE 166191.

Elle Seybold, et al., Evolution of Dual Fuel Pressure Pumping for Fracturing: Methods, Economics, Field Trial Results and Improvements in Availability of Fuel, Copyright 2013, Society of Petroleum Engineers, SPE 166443.

Wallace, E.M., Associated Shale Gas: From Flares to Rig Power, Copyright 2015, Society of Petroleum Engineers, SPE-173491-MS.

Williams, C.W. (Gulf Oil Corp. Odessa Texas), The Use of Gas-turbine Engines in an Automated High-Pressure Water-injection Stations; American Petroleum Institute; API-63-144 (Jan. 1, 1963).

Neal, J.C. (Gulf Oil Corp. Odessa Texas), Gas Turbine Driven Centrifugal Pumps for High Pressure Water Injection; American Institute of Mining, Metallurgical and Petroleum Engineers, Inc.; SPE-1888 (1967).

Porter, John A. (SOLAR Division International Harvester Co.), Modern Industrial Gas Turbines for the Oil Field; American Petroleum Institute; Drilling and Production Practice; API-67-243 (Jan. 1, 1967).

Cooper et al., Jet Frac Porta-Skid—A New Concept in Oil Field Service Pump Equipments[sic]; Halliburton Services; SPE-2706 (1969).

Ibragimov, É.S., Use of gas-turbine engines in oil field pumping units; Chem Petrol Eng; (1994) 30: 530. https://doi.org/10.1007/BF01154919. (Translated from Khimicheskaya i Neftyanoe Mashinostroenie, No. 11, pp. 24-26, Nov. 1994.).

Kas'yanov et al., Application of gas-turbine engines in pumping units complexes of hydraulic fracturing of oil and gas reservoirs; Exposition Oil & Gas; (Oct. 2012) (published in Russian).

AFGlobal Corporation, Durastim Hydraulic Fracturing Pump, A Revolutionary Design for Continuous Duty Hydraulic Fracturing, 2018.

\* cited by examiner

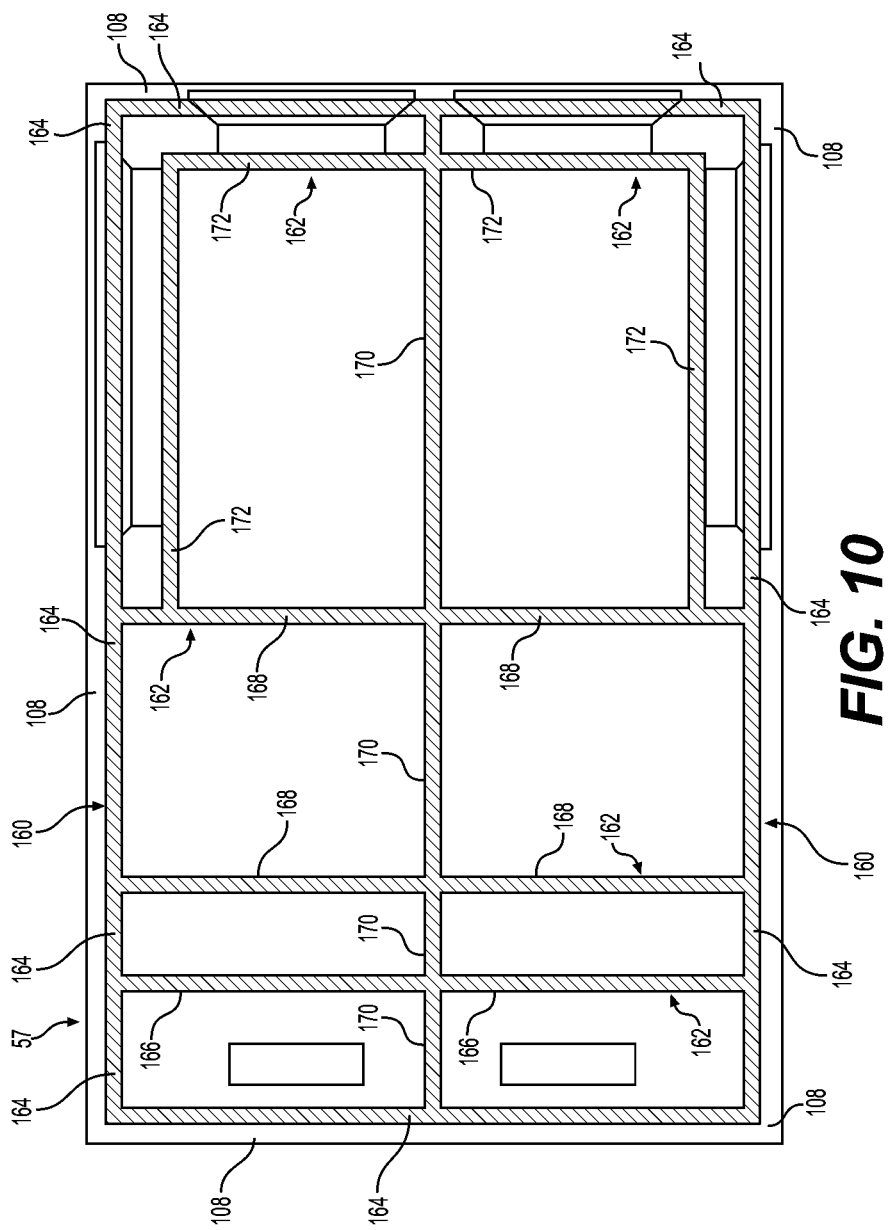

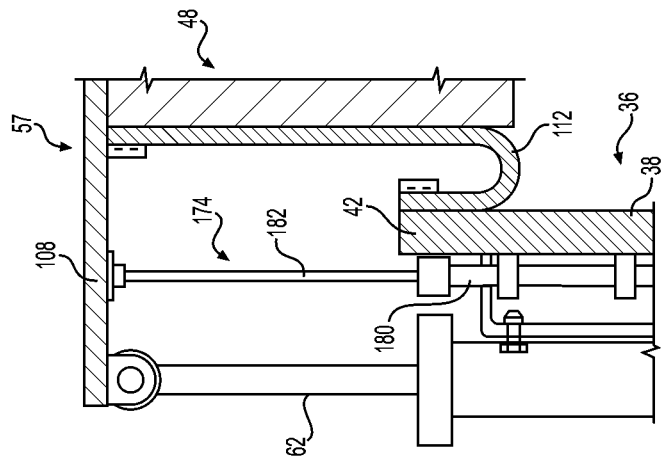
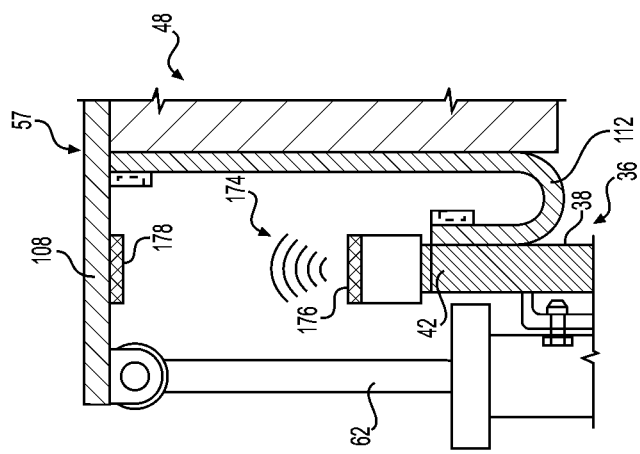

United States Patent US 10,961,908 B1

SYSTEMS AND METHODS TO ENHANCE INTAKE AIR FLOW TO A GAS TURBINE ENGINE OF A HYDRAULIC FRACTURING UNIT

CROSS REFERENCE TO RELATED APPLICATION

This application claims the benefit of and priority to U.S. Provisional Patent Application No. 62/704,987, filed Jun. 5, 2020, titled "SYSTEMS AND METHODS TO ENHANCE INTAKE AIR FLOW TO A GAS TURBINE ENGINE OF A HYDRAULIC FRACTURING UNIT," and hereby is incorporated by reference for all purposes as if presented herein in its entirety.

TECHNICAL FIELD

The present disclosure relates to systems and methods for enhancing intake air flow to a gas turbine engine and, more particularly, to systems and methods for enhancing intake air flow to a gas turbine engine of a hydraulic fracturing unit.

BACKGROUND

Hydraulic fracturing is an oilfield operation that stimulates production of hydrocarbons, such that the hydrocarbons may more easily or readily flow from a subsurface formation to a well. For example, a fracturing system may be configured to fracture a formation by pumping a fracturing fluid into a well at high pressure and high flow rates. Some fracturing fluids may take the form of a slurry including water, proppants, and/or other additives, such as thickening agents and/or gels. The slurry may be forced via one or more pumps into the formation at rates faster than can be accepted by the existing pores, fractures, faults, or other spaces within the formation. As a result, pressure builds rapidly to the point where the formation may fail and may begin to fracture. By continuing to pump the fracturing fluid into the formation, existing fractures in the formation are caused to expand and extend in directions farther away from a well bore, thereby creating flow paths to the well bore. The proppants may serve to prevent the expanded fractures from closing when pumping of the fracturing fluid is ceased or may reduce the extent to which the expanded fractures contract when pumping of the fracturing fluid is ceased. Once the formation is fractured, large quantities of the injected fracturing fluid are allowed to flow out of the well, and the production stream of hydrocarbons may be obtained from the formation.

Prime movers may be used to supply power to hydraulic fracturing pumps for pumping the fracturing fluid into the formation. For example, a plurality of gas turbine engines may each be mechanically connected to a corresponding hydraulic fracturing pump via a transmission and operated to drive the hydraulic fracturing pump. The gas turbine engine, hydraulic fracturing pump, transmission, and auxiliary components associated with the gas turbine engine, hydraulic fracturing pump, and transmission may be connected to a common platform or trailer for transportation and set-up as a hydraulic fracturing unit at the site of a fracturing operation, which may include up to a dozen or more of such hydraulic fracturing units operating together to perform the fracturing operation.

The performance of a gas turbine engine is dependent on the conditions under which the gas turbine engine operates. For example, ambient air pressure and temperature are large factors in the output of the gas turbine engine, with low ambient air pressure and high ambient temperature reducing the maximum output of the gas turbine engine. Low ambient pressure and/or high ambient temperature reduce the density of air, which reduces the mass flow of the air supplied to the intake of the gas turbine engine for combustion, which results in a lower power output. Some environments in which hydraulic fracturing operations occur are prone to low ambient pressure, for example, at higher elevations, and/or higher temperatures, for example, in hot climates. In addition, gas turbine engines are subject to damage by particulates in air supplied to the intake. Thus, in dusty environments, such as at many well sites, the air must be filtered before entering the intake of the gas turbine engine. However, filtration may reduce the pressure of air supplied to the intake, particularly as the filter medium of the filter becomes obstructed by filtered particulates with use. Reduced power output of the gas turbine engines reduces the pressure and/or flow rate provided by the corresponding hydraulic fracturing pumps of the hydraulic fracturing units. Thus, the effectiveness of a hydraulic fracturing operation may be compromised by reduced power output of the gas turbine engines of the hydraulic fracturing operation.

Accordingly, Applicant has recognized a need for systems and methods that provide improved air flow to the intake of a gas turbine engine for hydraulic fracturing operations. The present disclosure may address one or more of the above-referenced drawbacks, as well as other possible drawbacks.

SUMMARY

The present disclosure generally is directed to systems and methods for enhancing air flow to an intake of a gas turbine engine of a hydraulic fracturing unit. For example, in some embodiments, an enclosure for a gas turbine engine may increase air flow to a gas turbine engine when positioned in the enclosure. The enclosure may include a main housing including a main housing wall to connect to a platform to support the enclosure and the gas turbine engine. The main housing wall may include a remote end defining an upper perimeter. The enclosure also may include an intake expansion assembly to enhance intake air flow to the gas turbine engine. The intake expansion assembly may include an intake expansion wall including a first end defining an expansion perimeter positioned to fit inside or outside the upper perimeter of the main housing. The intake expansion assembly also may include a second end opposite the first end. The intake expansion wall may define a plurality of intake ports positioned to supply intake air to the gas turbine engine when positioned in the enclosure. The intake expansion assembly further may include a roof panel connected to the second end of the intake expansion wall and enclosing the second end of the intake expansion wall. The enclosure also may include one or more actuators connected to the main housing and the intake expansion assembly and positioned to cause the intake expansion wall to move relative to the main housing between a first position preventing air flow through the plurality of intake ports and a second position providing air flow through the plurality of intake ports to an interior of the enclosure.

According some embodiments, a power assembly to provide power to a hydraulic fracturing unit including a driveshaft to connect to a hydraulic fracturing pump, a transmission to connect to a gas turbine engine for driving the driveshaft and thereby the hydraulic fracturing pump, may include an enclosure to connect to and be supported by a platform. The power assembly also may include a gas turbine engine positioned in the enclosure and to be connected to the hydraulic fracturing pump via the transmission and the driveshaft. The enclosure may include a main housing including a main housing wall to connect to a platform to support the enclosure and the gas turbine engine. The enclosure also may include an intake expansion assembly to enhance intake air flow to the gas turbine engine positioned in the enclosure. The intake expansion assembly may include an intake expansion wall defining a plurality of intake ports positioned to supply intake air to the gas turbine engine. The enclosure further may include one or more actuators connected to the main housing and the intake expansion assembly, and positioned to cause the intake expansion wall to move relative to the main housing between a first position preventing air flow through the plurality of intake ports and a second position providing air flow through the plurality of intake ports to an interior of the enclosure.

According to some embodiments, a method for operating a gas turbine engine positioned in an enclosure including a main housing and an intake expansion assembly including a plurality of intake ports to enhance air flow to the gas turbine engine, may include activating one or more actuators to cause the intake expansion assembly to move relative to the main housing from a first position preventing air flow through the plurality of intake ports to a second position providing air flow through the plurality of intake ports to an interior of the enclosure. The method also may include receiving one or more position signals from one or more sensors configured to generate signals indicative of a position of the intake expansion assembly relative to the main housing. The method further may include determining, based at least in part on the one or more position signals, whether the intake expansion assembly is in the second position. The method still further may include initiating operation of the gas turbine engine when the intake expansion assembly is in the second position.

Still other aspects and advantages of these exemplary embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features of the present invention herein disclosed, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than can be necessary for a fundamental understanding of the embodiments discussed herein and the various ways in which they can be practiced. According to common practice, the various features of the drawings discussed below are not necessarily drawn to scale. Dimensions of various features and elements in the drawings can be expanded or reduced to more clearly illustrate embodiments of the disclosure.

FIG. 10 is an underside schematic view of an example roof panel illustrating an example seal material configuration to seal portions of the intake expansion assembly with the roof panel according to an embodiment of the disclosure.

FIG. 11A is a partial side section view of an example sensor and actuator connected to an example main housing wall and an example roof panel according to an embodiment of the disclosure.

FIG. 11B is a partial side section view of another example sensor and actuator connected to an example main housing wall and an example roof panel according to an embodiment of the disclosure.

DETAILED DESCRIPTION

The drawings like numerals to indicate like parts throughout the several views, the following description is provided as an enabling teaching of exemplary embodiments, and those skilled in the relevant art will recognize that many changes may be made to the embodiments described. It also will be apparent that some of the desired benefits of the embodiments described can be obtained by selecting some of the features of the embodiments without utilizing other features. Accordingly, those skilled in the art will recognize that many modifications and adaptations to the embodiments described are possible and may even be desirable in certain circumstances. Thus, the following description is provided as illustrative of the principles of the embodiments and not in limitation thereof.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to," unless otherwise stated. Thus, the use of such terms is meant to encompass the items listed thereafter, and equivalents thereof, as well as additional items. The transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

Figure 1:
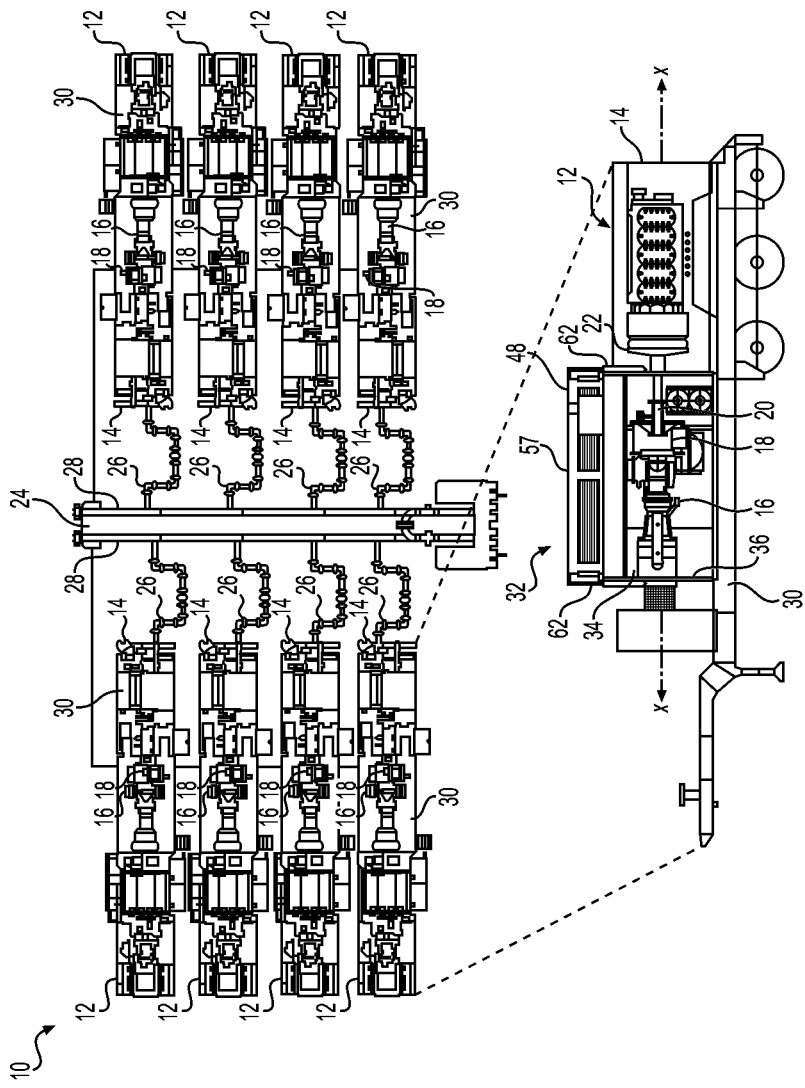
FIG. 1 schematically illustrates an example hydraulic fracturing system including a plurality of hydraulic fracturing units, and including a partial side section view of a hydraulic fracturing unit according to embodiments of the disclosure.

FIG. 1 schematically illustrates an example hydraulic fracturing system 10 including a plurality (or fleet) of hydraulic fracturing units 12, and a partial side section view of an example hydraulic fracturing unit 12 according to embodiments of the disclosure. The plurality of hydraulic fracturing units 12 may be configured to pump a fracturing fluid into a well at high pressure and high flow rates, so that a subterranean formation may fail and may begin to fracture in order to promote hydrocarbon production from the well.

In some embodiments, one or more of the hydraulic fracturing units 12 may include a hydraulic fracturing pump 14 driven by a gas turbine engine (GTE) 16. For example, in some embodiments, each of the hydraulic fracturing units 12 includes a directly-driven turbine (DDT) hydraulic fracturing pump 14, in which the hydraulic fracturing pump 14 is connected to one or more GTEs 16 that supply power to the respective hydraulic fracturing pump 14 for supplying fracturing fluid at high pressure and high flow rates to a formation. For example, the GTE 16 may be connected to a respective hydraulic fracturing pump 14 via a transmission 18 (e.g., a reduction transmission) connected to a drive shaft 20, which, in turn, is connected to a driveshaft or input flange 22 of a respective hydraulic fracturing pump 14 (e.g., a reciprocating hydraulic fracturing pump). Other types of engine-to-pump arrangements are contemplated.

In some embodiments, one or more of the GTEs 16 may be a dual-fuel or bi-fuel GTE, for example, capable of being operated using of two or more different types of fuel, such as natural gas and diesel fuel, although other types of fuel are contemplated. For example, a dual-fuel or bi-fuel GTE may be capable of being operated using a first type of fuel, a second type of fuel, and/or a combination of the first type of fuel and the second type of fuel. For example, the fuel may include gaseous fuels, such as, for example, compressed natural gas (CNG), natural gas, field gas, pipeline gas, methane, propane, butane, and/or liquid fuels, such as, for example, diesel fuel (e.g., #2 diesel), bio-diesel fuel, bio-fuel, alcohol, gasoline, gasohol, aviation fuel, and other fuels as will be understood by those skilled in the art. Gaseous fuels may be supplied by CNG bulk vessels, a gas compressor, a liquid natural gas vaporizer, line gas, and/or well-gas produced natural gas. Other types and associated fuel supply sources are contemplated. The one or more GTEs 16 may be operated to provide horsepower to drive the transmission 18 connected to one or more of the hydraulic fracturing pumps 14 to safely and successfully fracture a formation during a well stimulation project or fracturing operation.

As will be understood by those skilled in the art, the hydraulic fracturing system 10 may include a plurality of water tanks for supplying water for a fracturing fluid, one or more chemical tanks for supplying gels or agents for adding to the fracturing fluid, and a plurality of proppant tanks (e.g., sand tanks) for supplying proppants for the fracturing fluid. The hydraulic fracturing system 10 also may include a hydration unit for mixing water from the water tanks and gels and/or agents from the chemical tank to form a mixture, for example, gelled water. The hydraulic fracturing system 10 further may include a blender, which receives the mixture from the hydration unit and proppants via conveyers from the proppant tanks. The blender may mix the mixture and the proppants into a slurry to serve as fracturing fluid for the hydraulic fracturing system 10. Once combined, the slurry may be discharged through low-pressure hoses, which convey the slurry into two or more low-pressure lines in a frac manifold 24, as shown in FIG. 1. Low-pressure lines in the frac manifold 24 may feed the slurry to the plurality of hydraulic fracturing pumps 14 shown in FIG. 1, through low-pressure suction hoses.

In the example embodiment shown, each of the plurality hydraulic fracturing units 12 includes a GTE 16. Each of the GTEs 16 supplies power via the transmission 18 for each of the hydraulic fracturing units 12 to operate the hydraulic fracturing pump 14. The hydraulic fracturing pumps 14, driven by the GTEs 16 of corresponding hydraulic fracturing units 12, discharge the slurry (e.g., the fracturing fluid including the water, agents, gels, and/or proppants) at high pressure and/or a high flow rates through individual high-pressure discharge lines 26 into two or more high-pressure flow lines 28, sometimes referred to as "missiles," on the frac manifold 24. The flow from the high-pressure flow lines 28 is combined at the frac manifold 24, and one or more of the high-pressure flow lines 28 provide fluid flow to a manifold assembly, sometimes referred to as a "goat head." The manifold assembly delivers the slurry into a wellhead manifold, sometimes referred to as a "zipper manifold" or a "frac manifold." The wellhead manifold may be configured to selectively divert the slurry to, for example, one or more well heads via operation of one or more valves. Once the fracturing process is ceased or completed, flow returning from the fractured formation discharges into a flowback manifold, and the returned flow may be collected in one or more flowback tanks.

In the embodiment shown in FIG. 1, one or more of the components of the hydraulic fracturing system 10 may be configured to be portable, so that the hydraulic fracturing system 10 may be transported to a well site, assembled, operated for a relatively short period of time to complete a hydraulic fracturing operation, at least partially disassembled, and transported to another location of another well site for assembly and use. In the example shown in FIG. 1, each of the hydraulic fracturing pumps 14 and GTEs 16 of a respective hydraulic fracturing unit 12 may be connected to (e.g., mounted on) a platform 30. In some embodiments, the platform 30 may be, or include, a trailer (e.g., a flat-bed trailer) including a tongue for connecting to a truck and wheels to facilitate movement of the trailer, for example, as shown in FIG. 1, and/or a truck body to which the components of a respective hydraulic fracturing unit 12 may be connected. For example, the components may be carried by trailers and/or incorporated into trucks, so that they may be more easily transported between well sites.

As will be understood by those skilled in the art, the hydraulic fracturing system 10 may include a fuel supply assembly for supplying fuel to each of the hydraulic fracturing units 12, a communications assembly enabling communications to and/or among the hydraulic fracturing units 12, and/or an electric power assembly to supply electric power to and/or among the hydraulic fracturing units 12. One or more of such assemblies may be arranged according to a "daisy-chain" arrangement, a "hub-and-spoke" arrangement, a combination "daisy-chain" and "hub-and-spoke" arrangement, and modifications thereof. The fuel supply assembly may include one or more fuel lines configured to supply fuel from a fuel source to the plurality of hydraulic fracturing units 12.

The communications assembly may include one or more communications cables connected to each of the hydraulic fracturing units 12 and configured to enable data communications between the respective hydraulic fracturing units 12 and a data center located at a position remote from the hydraulic fracturing units 12 or among the hydraulic fracturing units 12. For example, a data center communications cable may provide a communications link between the data center and one or more of the hydraulic fracturing units 12, and one or more of the hydraulic fracturing units 12 may include a communications cable to provide communications to other hydraulic fracturing units 12 of the hydraulic fracturing system 10. In this example fashion, each of the hydraulic fracturing units 12 may be linked to one another and/or to the data center. In some embodiments, the data center may be configured to transmit communications signals and/or receive communications signals, and the communications signals may include data indicative of operation of one or more of the plurality of hydraulic fracturing units 12, including, for example, parameters associated with operation of the hydraulic fracturing pumps 14 and/or the GTEs 16, as well as additional data related to other parameters associated with operation and/or testing of one or more of the hydraulic fracturing units 12.

In some embodiments, the electric power assembly may include one or more power cables connected to one or more (e.g., each) of the hydraulic fracturing units 12 and configured to convey electric power between the hydraulic fracturing units 12 and a remote electrical power source or one or more additional hydraulic fracturing units 12 of the hydraulic fracturing system 10. The electrical power source may be located remotely, such that the electrical power source is not mechanically connected directly to the platform 30 of one or more of the hydraulic fracturing units 12. In some embodiments, the electrical power source may include one or more power generation devices and/or one or more batteries. For example, the electrical power source may include one or more gensets (e.g., including an internal combustion engine-driven electrical power generator) and/or one or more electric power storage devices, such as, for example, one or more batteries. In some embodiments, one or more of the hydraulic fracturing units 12 may include one or more gensets, one or more batteries, and/or one or more solar panels to supply electrical power to the corresponding hydraulic fracturing unit 12 and, in some examples, other hydraulic fracturing units 12 of the hydraulic fracturing system 10. In some such examples, each of the hydraulic fracturing units 12 may supply and/or generate its own electrical power, for example, by operation of a generator connected to the GTE 16 and/or to another source of mechanical power, such as another gas turbine engine or a reciprocating-piston engine (e.g., a diesel engine) connected to the hydraulic fracturing unit 12. In some embodiments, some, or all, of the hydraulic fracturing units 12 may be electrically connected to one another, such that electrical power may be shared among at least some, or all, of the hydraulic fracturing units 12. Thus, if one or more of the hydraulic fracturing units 12 is unable to generate its own electrical power or is unable to generate a sufficient amount of electrical power to meet its operational requirements, electrical power from one or more of the remaining hydraulic fracturing units 12 may be used to mitigate or overcome the electrical power deficit.

Figure 2A:
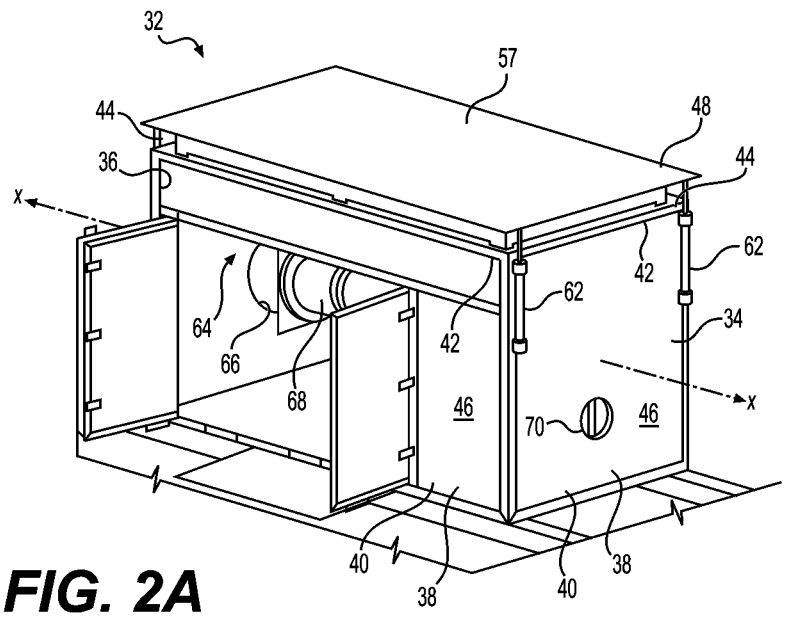
FIG. 2A is a perspective view of an example power assembly including an example gas turbine engine and transmission positioned in an example enclosure with the enclosure in a first configuration according to an embodiment of the disclosure.
Figure 2B:
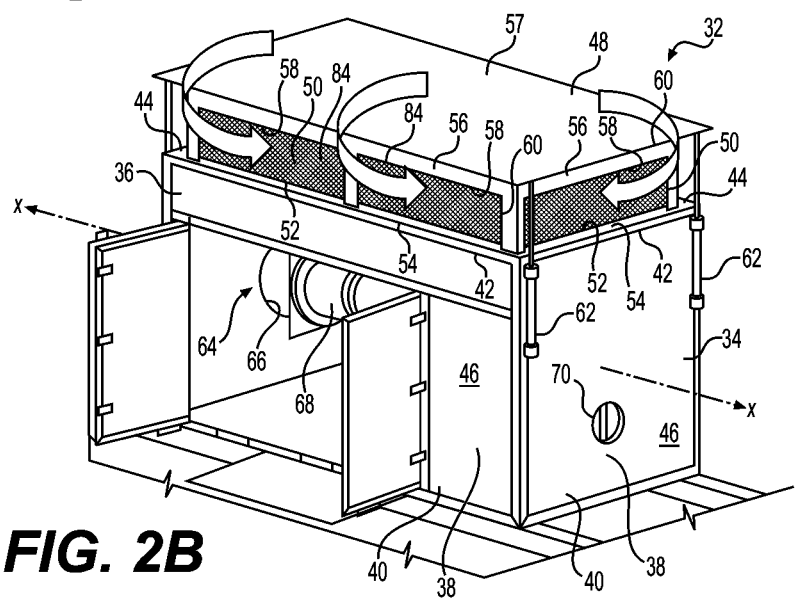
FIG. 2B is perspective view of the example power assembly shown in FIG. 2A in a second configuration according to an embodiment of the disclosure.

As shown in FIG. 1, one or more of the hydraulic fracturing units 12 may include a power assembly 32 including an enclosure 34 to connect to and be supported by the platform 30 according to embodiments of the disclosure. In some embodiments, as shown, the GTE 16 of the hydraulic fracturing unit 12 may be positioned in the enclosure 34 and connected to the hydraulic fracturing pump 14 via the transmission 18 and the driveshaft 20. As shown in FIG. 1, some embodiments of the enclosure 34 may include a main housing 36 including a main housing wall 38 to connect to the platform 30 supporting the enclosure 34 and the GTE 16. For example, the main housing wall 38 may include a proximal end 40 connected to the platform 30 and a remote end 42 defining an upper perimeter 44. In some embodiments, for example as shown in FIGS. 2A and 2B, the main housing wall 38 may include four substantially planar wall sections 46 forming a substantially rectangular upper perimeter 44. Upper perimeters 44 having different shapes (e.g., non-rectangular shapes) are contemplated.

Figure 3:
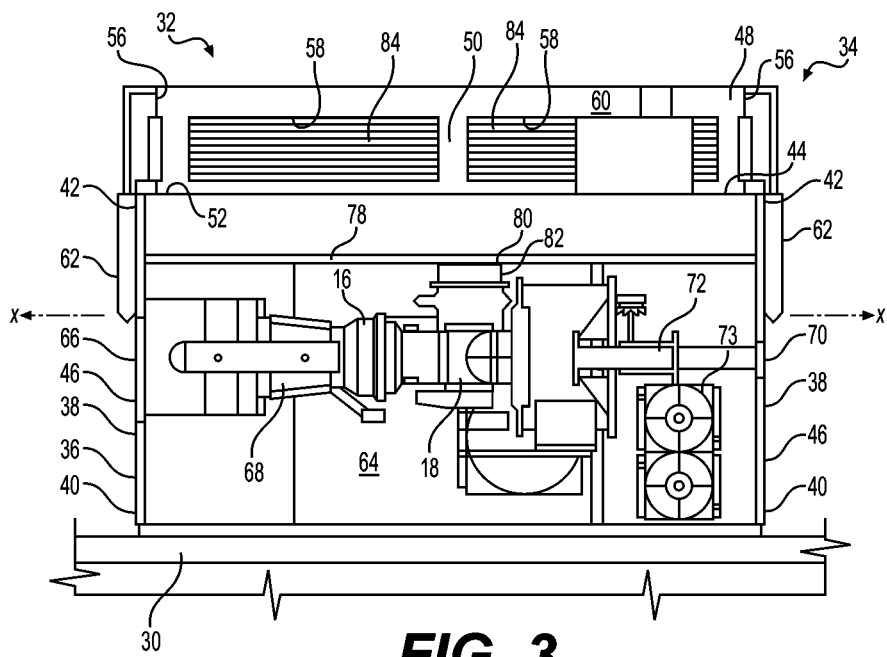
FIG. 3 is a partial side section view of the example power assembly shown in FIG. 2A in the second configuration according to an embodiment of the disclosure.

As shown in FIG. 1, some embodiments of the enclosure 34 also may include an intake expansion assembly 48 to enhance intake air flow to the GTE 16. For example, the intake expansion assembly 48 may include an intake expansion wall 50 including a first end 52 defining an expansion perimeter 54 positioned to fit either inside or outside the upper perimeter 44 of the main housing 36. For example, as shown in FIGS. 2A, 2B, and 3, the expansion perimeter 54 fits inside the upper perimeter 44 of the main housing 36, for example, such that the first end 52 of the intake expansion wall 50 fits within the upper perimeter 44 of the main housing 36. The intake expansion wall 50 also may include a second end 56 opposite the first end 52. In the example shown, the intake expansion assembly 48 also includes a roof panel 57 connected to the second end 56 of the intake expansion wall 50, at least substantially closing an opening formed by the second end 56 of the intake expansion wall 50. The intake expansion wall 50 also may define a plurality of intake ports 58 positioned to supply intake air to the GTE 16 positioned in the enclosure 34. In some embodiments, the intake expansion wall 50 may include four substantially planar intake wall sections 60 forming a substantially rectangular expansion perimeter 54. Expansion perimeters 54 having different shapes (e.g., non-rectangular shapes) are contemplated.

FIGS. 2A and 2B are perspective views of an example power assembly 32 including an example enclosure 34, with the enclosure 34 in a first configuration (FIG. 2A) and a second configuration (FIG. 2B), according to an embodiment of the disclosure. FIG. 3 is a partial side section view of the example power assembly 32 shown in FIGS. 2A and 2B in the second configuration according to an embodiment of the disclosure. As shown in FIGS. 1, 2A, 2B, and 3, some embodiments of the enclosure 34 also may include one or more actuators 62 connected to the main housing 38 and the intake expansion assembly 48, and positioned to cause the intake expansion wall 50 move relative to the main housing 38 between a first position, as shown in FIG. 2A, preventing air flow through the plurality of intake ports 58, and a second position, as shown in FIGS. 2B and 3, providing air flow through the plurality of intake ports 58 to an interior 64 of the enclosure 34. For example, in the embodiment shown, the intake expansion wall 50 is positioned with respect to the main housing wall 38, such that activation of the one or more actuators 62 causes the intake expansion wall 50 to move between a retracted position, as shown in FIG. 2A, preventing air flow through the plurality of intake ports 58, to an extended position, as shown in FIGS. 2B and 3, providing air flow through the plurality of intake ports 58 to the interior 64 of the enclosure 34.

In some embodiments, the intake expansion assembly 48 may serve to enhance intake air flow to the GTE 16, for example, providing a relatively greater mass flow of air for combustion by the GTE 16. For example, the relatively greater mass flow of air may be provided, at least in part, by increasing the area through which air is drawn into the intake of the GTE 16. Because the intake expansion assembly 48 expands relative to the enclosure in which the GTE 16 is positioned, the area of the intake ports 58 and/or the number of intake ports 58 may be increased, resulting in a relatively larger total area for drawing air into the intake of the GTE 16. This may mitigate or eliminate the effects of reduced ambient air pressure and/or elevated ambient air temperature in an environment in which the GTE 16 is operating, such as an environment at a high elevation and/or a warmer climate at which hydraulic fracturing operation is being performed by the hydraulic fracturing system 10 including the hydraulic fracturing units 12. In some examples, pressure drop of air entering the intake of the GTE 16 due to the air passing through filtration devices may be mitigated or eliminated due to the relatively increased mass flow of air. In addition, in some embodiments, the expandable and retractable capability of the intake expansion assembly 48 may facilitate transport of the hydraulic fracturing unit 12 between well sites using public highways, while complying with government regulations related to the maximum dimensions of vehicles permitted to travel on public highways.

As shown in FIGS. 2A, 2B, and 3, the main housing 36 may define a longitudinal axis X extending between opposing wall sections 46 located at opposite ends of the main housing 36. A first one of the opposing wall sections 46 may include an exhaust duct port 66 through which exhaust from operation of the GTE 16 passes via an exhaust duct 68 of the GTE 16. A second one of the opposing wall sections 46 may include a driveshaft port 70 through which a driveshaft 72 connecting the transmission 18 to the hydraulic fracturing pump 14 may pass. As shown in FIGS. 1 and 3, some embodiments of the enclosure 34 may include one or more heat exchangers 73 to cool air in the interior 64 of the enclosure 34. The one or more heat exchangers 73 may include one or more fans and/or one or more air-to-air or fluid-to-air radiators.

Figure 4:
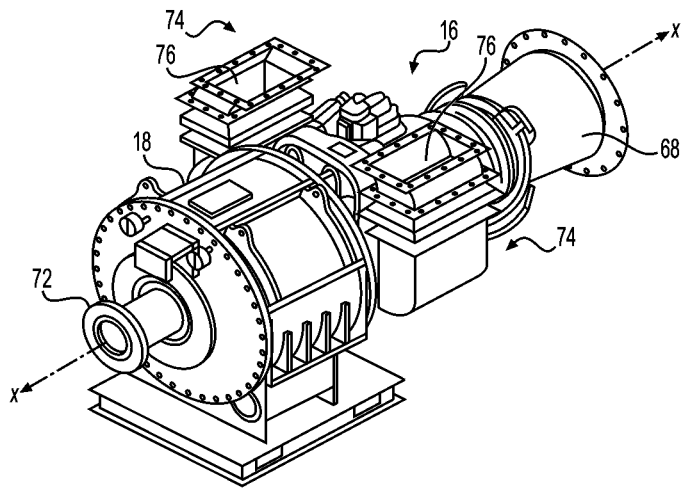
FIG. 4 is a perspective view of an example gas turbine engine and transmission according to an embodiment of the disclosure.

As shown in FIGS. 3 and 4, according to some embodiments, the GTE 16 includes an intake 74 configured to supply air drawn into the enclosure 36 to the GTE 16 for use during combustion. For example, as shown in FIG. 4, the GTE 16 includes two intake ports 76 configured to provide the GTE 16 with air for combustion. The example embodiment of intake expansion assembly 48 shown in FIG. 3 includes an expansion base 78 connected to the first end 52 of the intake expansion wall 50. As shown, the expansion base 78 may include one or more expansion base intake ports 80 providing intake flow between the one or more expansion base intake ports 80 and the intake 74 of the GTE 16 when the intake expansion wall 50 is in the second position (e.g., in the expanded condition). In some embodiments, the power assembly 32 may also include one or more intake ducts 82 connected to the expansion base 78 at the one or more expansion base intake ports 80 and the intake 74 of the GTE 16. For example, each of the one or more intake ducts 82 may be connected at one end to the expansion base intake ports 80 and at a second end to the intake ports 76 of the intake 74 of the GTE 16 to provide one or more conduits to supply air to the GTE 16 for combustion. In some embodiments, the one or more intake ducts 82 may be flexible to change from an at least partially retracted condition when the intake expansion assembly 48 is in the first position (e.g., the retracted condition) to an extended condition when the intake expansion assembly 48 moves from the first position to the second position (e.g., the expanded condition, for example, as shown in FIG. 3).

As shown in FIGS. 2B and 3, some embodiments of the intake expansion assembly 48 may include one or more filters 84 connected to the intake expansion wall 50 to filter air entering the enclosure 34 via the plurality of intake ports 58. For example, the one or more filters 84 may include a filter frame 86 and a screen mesh 88 retained by the filter frame 86. In some examples, the screen mesh 88 may have a mesh size 3 with the mesh wire size being at least about 0.047 inches in diameter. In some examples, the screen mesh 88 may be woven, double-crimped, and/or brazed.

In some examples, one of more the intake ports 58 and one or more of the filters 84 may be provided on three sides of the intake expansion wall 50. For example, one of the four intake wall sections 60 may not include any intake ports 58 or filters 84. In some embodiments, for example, the intake wall section 60 adjacent the main housing wall section 46 that includes the exhaust duct port 66 may be devoid of any intake port to prevent exhaust exiting the exhaust duct port 66 from entering the intake 74 of the GTE 16 during operation.

Figure 5:
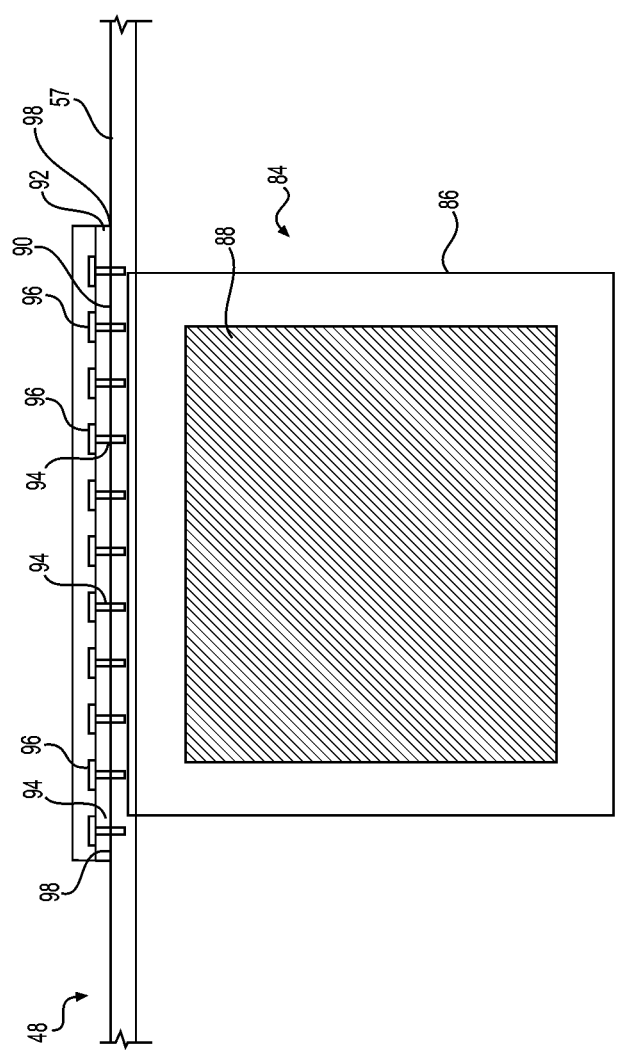
FIG. 5 is a partial side section view of an example roof panel of an intake expansion assembly including an example filter according to an embodiment of the disclosure.

FIG. 5 is a partial side section view of an example roof panel 57 of an intake expansion assembly 48, including an example filter 84 according to an embodiment of the disclosure. In the example shown, the roof panel 57 may include one or more slots 90 through which the one or more filters 84 may slide into position to cover a corresponding one or more of the intake ports 58 in the intake expansion wall 50. In some embodiments, one or more retention rails may be connected to an interior side of the intake expansion wall 50 to form a retainer frame into which the one or more filters 84 may slide and be retained therein. For example, the retention rails may include U-channels and/or C-channels attached to the interior side of the intake expansion wall 50 to provide recesses into which edges of the filter 84 may be received. In some examples, the retention rails, the retainer frame, and/or the filter frame 86 may be configured to provide a substantially air-tight seal between the edges of the filter 84 and edges of the intake ports 58 to prevent particulates from entering the interior 64 of the enclosure 34 without passing through the filter 84. For example, the retention rails, the retainer frame, and/or the filter frame 86 may include a seal material, such as a gasket and/or sealant to provide the substantially air-tight seal.

As shown in FIG. 5, some embodiments of the filter 84 may also include a retainer bar 92 configured to secure the filter 84 in its installed position with respect to the intake port 58. For example, the retainer bar 92 may be attached to one edge of the filter 84, for example, to one edge of the filter frame 86, such that when the filter 84 slides into position with respect to the intake port 58, the retainer bar 92 may be positioned substantially flush with an upper surface of the roof panel 57. The retainer bar 92, in some examples, may include a plurality of holes 94 configured to receive fasteners 96, such as bolts and/or screws, to secure the retainer bar 92 to the roof panel 57. In some examples, a seal material 98, such as a gasket and/or sealant may be provided between the retainer bar 92 and an upper surface of the roof panel 57 to prevent fluid and/or particulates from entering the intake expansion assembly 48 via the slots 90 in the roof panel 90.

In some examples, the intake expansion assembly 48 may also include one or more second filters positioned in the intake expansion assembly 48 between the one or more filters 84 and the intake 74 of the GTE 16. For example, the one or more second filters may comprise a second set of filters interior with respect to the filters 84, for example, such that air entering the intake expansion assembly 48 is subjected to two levels of filtration prior to entering the intake 74 of the GTE 16. In some examples, the second set of filters may be positioned relative to the filters 84 to provide relatively less turbulent flow and/or a relatively lower pressure drop of the air supplied to the intake 74 of the GTE 16.

In some examples, the filtration may be configured to permit entry of up to about 30,000 cubic feet per minute of air having a velocity of about 75 feet per second. The filtration, in some examples, may be configured to remove large particulates that may be harmful to the GTE 16 (e.g., to the axial compressor section of the GTE 16). Table 1 below provides examples of percentages of particles of certain sizes that may be removed for each measurable volume of air entering the intake expansion assembly 48. For example, as shown in Table 1, less than about 6% of particulates having a size of about 0.3 micrometers or less may be acceptable, while less than about 0.5% of particulates having a size of about 5.0 micrometers may be acceptable. In some examples, the filtration (e.g., the filters 84 and second filters) may be configured to remove 99% of water and moisture having a droplet size of about 60 micrometers with a salt content of less than about 0.005 parts per million. In some embodiments, the filters 84 and/or second filters may be configured such that the pressure drop of air passing through the filters is less than about two inches of water, for example, from filter inlet to filter outlet.

TABLE 1

Particle Fractional Efficiency

| Particle Size (micrometers) | Percent Retained |
|---|---|
| 0.3 μm | 94.0% |
| 0.5 μm | 96.0% |
| 1.0 μm | 98.8% |
| 5.0 μm | 99.5% |
| Overall Efficiency | 99.9% |

Figure 6:
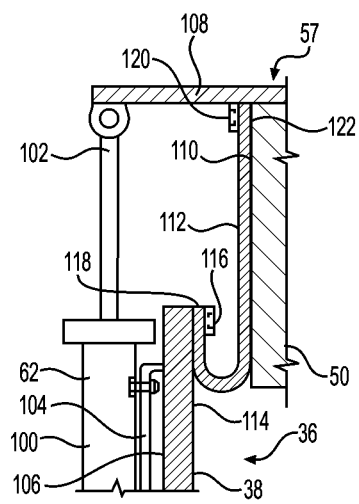
FIG. 6 is a partial side section view of an example actuator connected to an example main housing wall and an example intake expansion assembly of an enclosure according to an embodiment of the disclosure.

FIG. 6 is a partial side section view of an example actuator 62 connected to an example main housing wall 38 and an example intake expansion assembly 48 of an example enclosure 34 according to an embodiment of the disclosure. As shown in FIG. 6, in some embodiments, the one or more actuators 62 may include one or more linear actuators including a first end 100 connected to the main housing wall 38 and a second end 102 connected to the intake expansion assembly 48 and positioned such that activation of the one or more actuators 62 causes the intake expansion wall 50 to move between a retracted position preventing air flow through the plurality of intake ports 58 to an extended position providing air flow through the plurality of intake ports 58 to the interior 64 of the enclosure 34. For example, a mounting bracket 104 may be connected to an outer surface 106 of the main housing wall 38, and the first end of the actuator 62 may be connected to the mounting bracket 104. In some embodiments, the roof panel 57 may include a perimeter edge 108 extending laterally beyond an outer surface 110 of the intake expansion wall 50, and the second end 102 of the one or more actuators 62 may be connected to the perimeter edge 108 of the roof panel 57. In some examples, the perimeter edge 108 may extend beyond the outer surface 110 in an uninterrupted manner around the periphery of the intake expansion wall 50. In some embodiments, the perimeter edge 108 may be discontinuous, for example, extending beyond the outer surface 110 only to provide a connection point for the second end 102 of the one or more actuators 62.

The one or more actuators 62 may include one or more hydraulic linear actuators, one or more pneumatic linear actuators, and/or one or more electric linear actuators. In some embodiments, the one or more actuators 62 may include one or more rotary actuators, for example, one or more hydraulic rotary actuators, one or more pneumatic rotary actuators, and/or one of more electric rotary actuators. For example, the one or more rotary actuators may include an actuator base connected to the main housing 36 or the intake expansion assembly 48 and a rotary member connected to a linkage (e.g., a rack and/or a crank-rocker) connected to the other of the main housing 36 or the intake expansion assembly 48, for example, such that activation of the one or more rotary actuators causes the intake expansion wall 50 to move between a retracted position preventing air flow through the plurality of intake ports 58 to an extended position providing air flow through the plurality of intake ports 58 to the interior 64 of the enclosure 34. In some embodiments, the one or more actuators 62 may include a combination of linear actuators and rotary actuators. Other types of actuators are contemplated.

As shown in FIG. 6, some embodiments of the intake expansion assembly 48 may include a flexible membrane 112 extending between the main housing wall 38 and the intake expansion wall 50. The flexible membrane 112 may be configured provide a barrier to prevent air, particulates, and/or fluids from passing between the main housing wall 38 and the intake expansion wall 50, regardless of the position of the intake expansion assembly 48 relative to the main housing 36. In some examples, the flexible membrane 112 may be formed from natural and/or synthetic materials that are flexible, elastic, fluid-resistant, and/or air-resistant (e.g., a nitrile rubber sheet), for example, to prevent particulates, fluids, and/or air to pass through the flexible membrane 112 and/or to maintain a vacuum while the GTE 16 is operating and air is being supplied through the intake ports 58 to the intake 74 of the GTE 16. As shown, some embodiments of the flexible membrane 112 may be connected to the main housing wall 38 and/or the intake expansion wall 50 to provide a loop in the flexible membrane 112 when the intake expansion assembly 48 is in the retracted position, for example, as shown. The loop may reduce the likelihood or prevent the flexible membrane 112 from being pinched between the main housing wall 38 and the intake expansion wall 50 during retraction of the intake expansion assembly 48.

In some examples, the flexible membrane 112 may be continuous and extend around an inner surface 114 of the upper perimeter 44 of the main housing wall 38 and the outer surface 110 of the intake expansion wall 50 in an uninterrupted manner. For example, a first membrane retainer 116 may connect a first end 118 of the flexible membrane 112 to the main housing wall 38, and a second membrane retainer 120 may connect a second end 122 of the flexible membrane 112 to the intake expansion wall 50. The first and second membrane retainers 116 and 120 may include a bar or bars extending with the flexible membrane 112 and providing recessed holes for receiving retaining fasteners (e.g., screws and/or bolts) to secure the flexible membrane 112 to the main housing wall 38 and the intake expansion wall 50, for example, as shown in FIG. 6.

Figure 7:
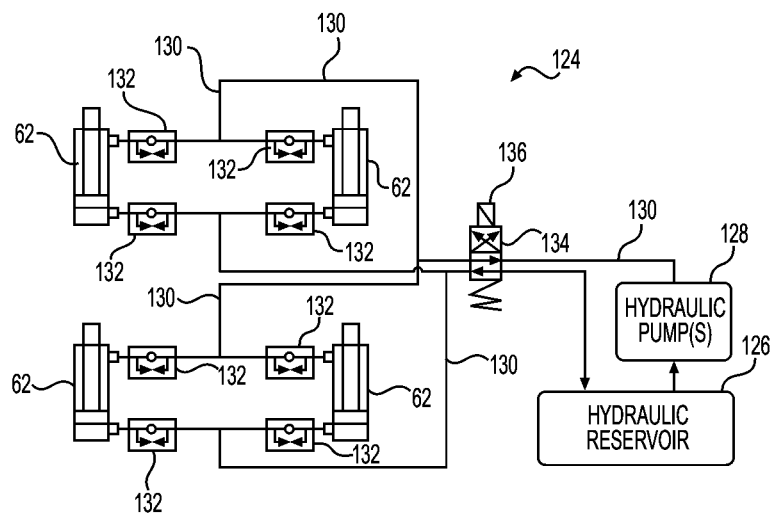
FIG. 7 is a schematic view of an example hydraulic assembly to control operation of a plurality of example hydraulic actuators according to an embodiment of the disclosure.

FIG. 7 is a schematic view of an example hydraulic assembly 124 configured to control operation of a plurality of example hydraulic actuators 62 according to an embodiment of the disclosure. As shown in FIG. 7, the example hydraulic assembly 124 includes a hydraulic reservoir 126 containing a supply of hydraulic fluid, and one or more hydraulic pumps 128 configured to draw hydraulic fluid from the hydraulic reservoir 126 and provide pressurized hydraulic fluid via the hydraulic conduits 130 to the components of the hydraulic assembly 124 for operation of the hydraulic actuators 62, and to return hydraulic fluid to the hydraulic reservoir 126.

In the example shown, the example hydraulic actuators 62 are double-acting hydraulic cylinders connected to the main housing 36 and the intake expansion assembly 48, for example, as described herein with respect to FIG. 6. The example hydraulic assembly 124 includes two flow control valves 132 to operate each of the hydraulic actuators 62. In some examples, the flow control valves 132 operate to allow hydraulic fluid to enter the hydraulic actuators 62 through a check valve at an unrestricted flow rate, but at a restricted flow rate when flowing from the hydraulic actuators 62, thereby reducing the speed of operation of the hydraulic actuators 62 when the cylinder of the hydraulic actuators 62 is retracting, which, in some examples, corresponds to the intake expansion assembly 48 retracting. The example hydraulic assembly 124 shown also includes a directional control valve 134 including an electrically-operated solenoid 136 to operate the directional control valve 134.

During operation of the example hydraulic assembly 124, which may be connected to the platform of the hydraulic fracturing unit 12 including the GTE 16 and enclosure 34, in a deactivated state, the solenoid 136 causes the directional control valve 134 to operate to retract the hydraulic actuators 62, thereby resulting in retraction of the intake expansion assembly 48. If a control signal is sent to the solenoid 136 to extend the intake expansion assembly 48, a spool in the directional control valve 134 shifts, diverting flow of hydraulic fluid to extend hydraulic actuators 62, thereby causing the intake expansion assembly 48 to extend to its second or extended position. In some examples, hydraulic fluid on the retraction end of the hydraulic cylinders 62 flows out of the hydraulic cylinders 62 via the flow control valves 132. The check valve in the flow control valves 132 blocks the flow and forces the fluid to exit the hydraulic actuators 62 through an orifice side of the flow control valves 132, resulting in a restriction in flow that slows operation of the hydraulic cylinders 62. To retract the hydraulic cylinders 62 and thereby retract the intake expansion assembly 48, the control signals to the solenoid may be discontinued and the spool may switch to a deactivated position, causing the intake expansion assembly 48 to retract to its retracted first position.

Figure 8:
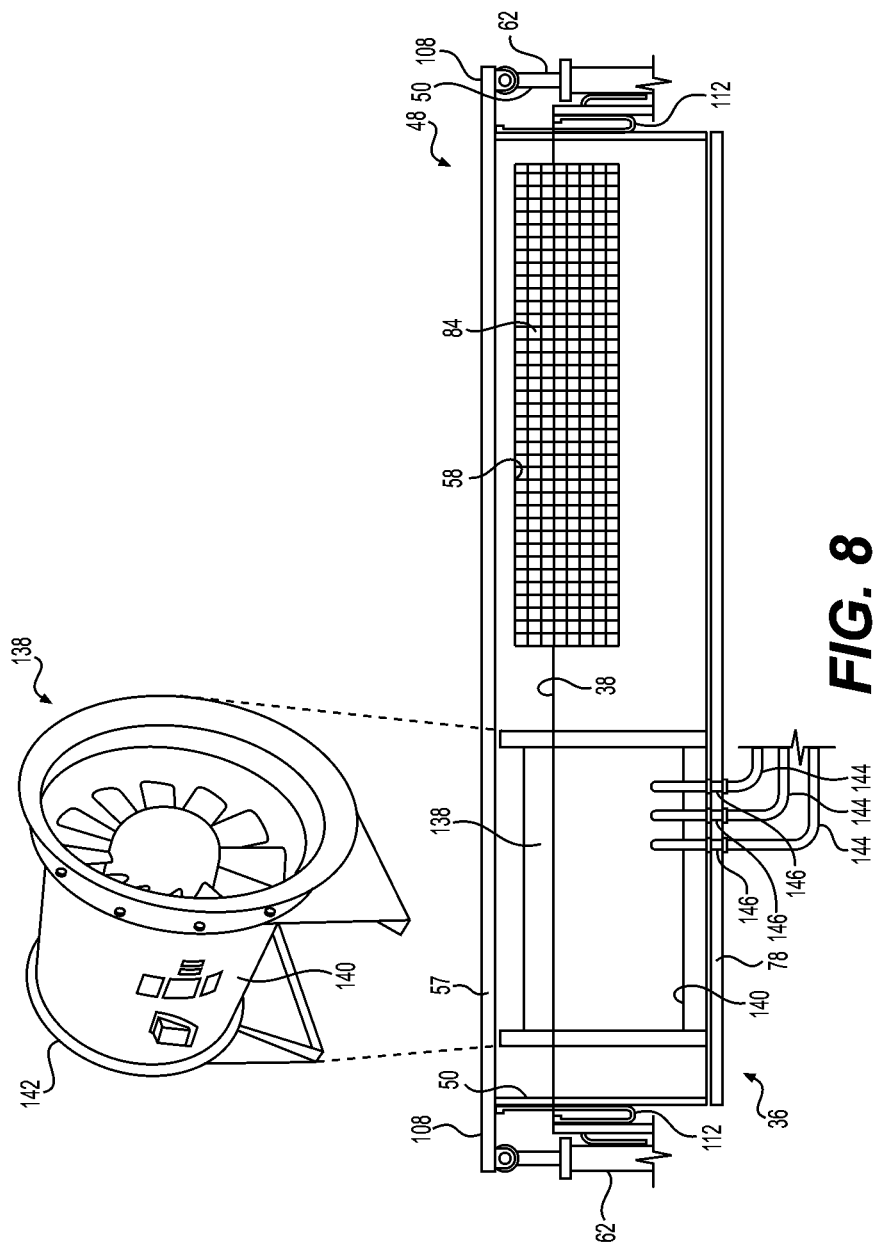
FIG. 8 is a partial side section view of an example intake expansion assembly partially extended from an example main housing according to an embodiment of the disclosure.

FIG. 8 is a partial side section view of an example intake expansion assembly 48 partially extended from an example main housing 36 according to an embodiment of the disclosure. As shown in FIG. 8, some embodiments of the enclosure 34 may include one or more fans 138 connected to the intake expansion assembly 48 and configured to draw air into the intake expansion assembly 48 for supply to the GTE 16 for combustion. For example, the one or more fans 138 may be at least partially enclosed in one or more fan housings 140 and driven by one or more fan motors 142, for example, as shown in FIG. 8. As shown, the one or more fan housings 140 may be connected to the intake expansion assembly 48, for example, to the expansion base 78.

In some embodiments, the one or more fans 138 may be axial flow fans and/or centrifugal flow fans, and the one or more fan motors 142 may be hydraulic motors and/or electric motors. As shown in FIG. 8, the intake expansion assembly 48 may include one or more lines 144 to supply power and/or control signals to the one or more fans 138. For example, in some embodiments, the one or more fan motors 142 may be hydraulic fan motors, and the one or more lines 144 may include a hydraulic fluid supply line, a hydraulic fluid return line, and a hydraulic fluid line for draining the hydraulic motor. In some embodiments, the one or more fan motors 142 may be electric fan motors, and the three one or more lines 144 may include electrical lines for supplying electrical power to each of three phases of a three-phase electric motor. The one or more lines 144 may be configured to pass through the expansion base 78 via holes 146, which may be configured to providing a sealing and/or sliding fit with the exterior surfaces of the lines 144. In some embodiments, the lines 144 may be flexible to accommodate retraction and extension of the intake expansion assembly 48.

Figure 9:
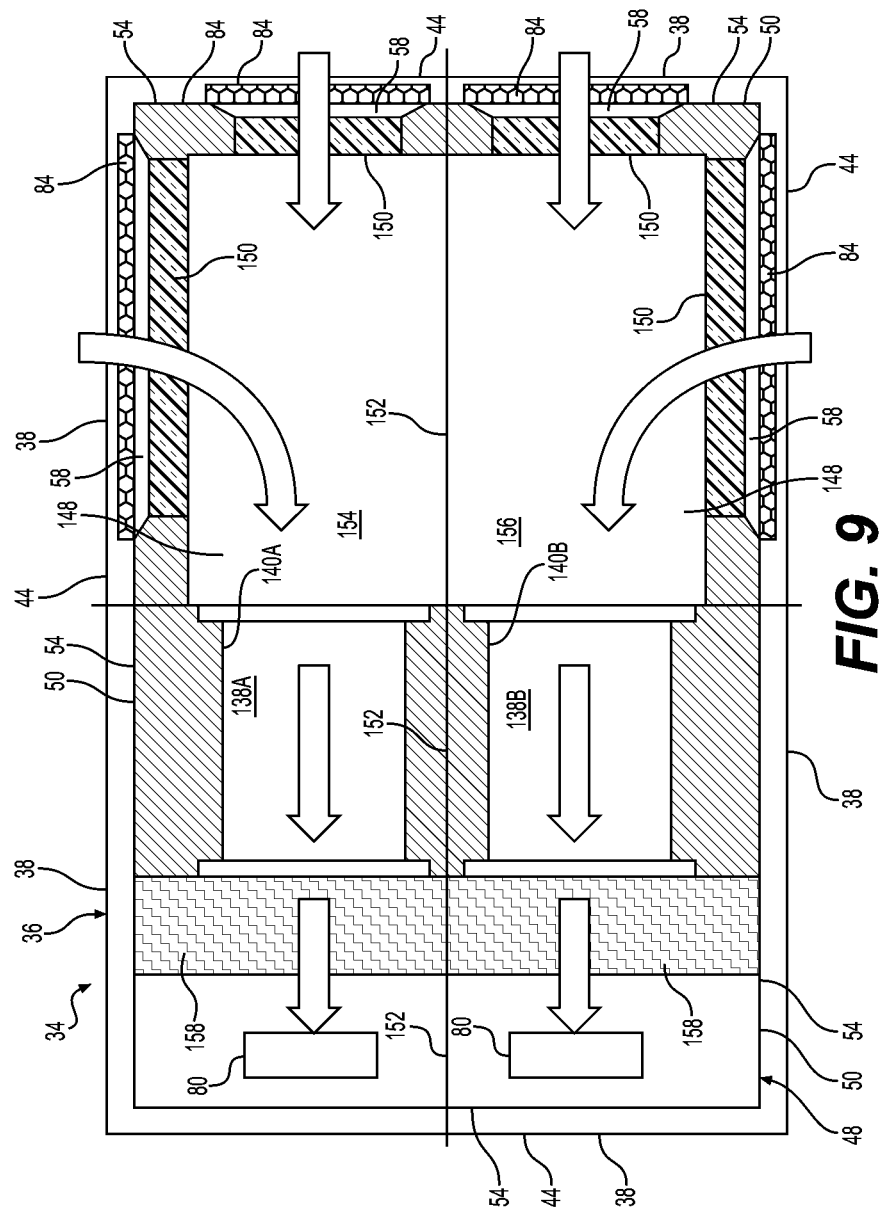
FIG. 9 is a schematic top view of an example enclosure including a main housing and an intake expansion assembly with a roof panel removed to illustrate an interior of the intake expansion assembly according to an embodiment of the disclosure.

FIG. 9 is a schematic top view of an example enclosure 34 including a main housing 36 and an intake expansion assembly 48 with the roof panel 57 removed to illustrate an interior 148 of the intake expansion assembly 48 according to an embodiment of the disclosure. As shown in FIG. 9, the intake expansion assembly 48 includes an intake expansion wall 50 defining an expansion perimeter 54 configured to fit inside the upper perimeter 44 of the main housing wall 38. The intake expansion wall 50 may define a plurality of intake ports 58 providing a flow path into the interior 148 of the intake expansion assembly 48. As described previously herein, first filters 84 may be connected to the intake expansion wall 50 and positioned to filter air passing through the intake ports 58 and into the interior 148 of the intake expansion assembly 48. In addition, in some embodiments, the intake expansion assembly 48 may include second filters 150 positioned relative to the intake ports 58, such that air passing through the first filters 84 is subjected to further filtration via the second filters 150 prior to passing into the interior 148 of the intake expansion assembly 48.

As shown in FIG. 9, the example intake expansion assembly 148 includes an interior partition 152 generally dividing the interior 148 of the intake expansion assembly 148 into a first portion 154 and a second portion 156. As shown, the first portion 154 of the interior 148 includes a first fan 138A in a first fan housing 140A for drawing air into the first portion 154 of the interior 148, and the second portion 156 of the interior 148 includes a second fan 138B in a second fan housing 140B for drawing air into the second portion 156 of the interior 148. In some examples, as shown in FIG. 9, the intake expansion assembly 48 may also include cooling coils 158 positioned downstream of the first fan 138A and the second fan 138B and configured to cool intake air pulled into the interior 148 of the intake expansion assembly 48 prior to entering the expansion base intake ports 80 positioned downstream of the cooling coils 158 and through which the intake air is supplied to the intake 74 of the GTE 16, for example, as previously described herein. In some examples, cooling the intake air supplied to the intake 74 of the GTE 16 may result in increasing the density of the intake air, thereby potentially increasing the power output of the GTE 16.

FIG. 10 is an underside schematic view of an example roof panel 57 illustrating an example seal material configuration 160 to seal portions of the intake expansion assembly 48 with the roof panel 57 according to an embodiment of the disclosure. As shown in FIG. 10, the underside of the roof panel 57 may include a plurality of seal material segments 162 configured to provide a substantially air-tight seal with the remainder of the intake expansion assembly 48 when the roof panel 57 is secured to the remainder of the intake expansion assembly 48. For example, the seal material segments 162 may include perimeter seal segments 164 positioned to provide a seal with the second end 56 of the intake expansion wall 50, cooling coil seal segments 166 positioned to provide a seal with edges of the cooling coils 158, fan seal segments 168 positioned to provide a seal with edges of the first and second fan housings 140A and 140B, a partition seal segment 170 positioned to provide a seal with an edge of the interior partition 152, and/or filter seal segments 172 positioned to provide a seal with edges of interior walls supporting the first filters 84 and/or second filters 150. Once the roof panel 57 is secured to the second end 56 of the intake expansion wall 50, the seal material segments 162 may provide an air-tight seal with the above-mentioned components of the intake expansion assembly 48 to ensure that air entering the intake 74 of the GTE 16 has been sufficiently filtered. In some examples, a plurality of mounting holes may be provided in the roof panel 57 through one or more of the seal material segments 162, such that the seal material segments 162 seal the mounting holes when fasteners, such as screws and/or bolts, are passed through the mounting holes to secure the roof panel 57 to the remainder of the intake expansion assembly 48.

FIGS. 11A and 11B are partial side section views of example sensors 174 and actuators 62 connected to an example main housing wall 38 and an example roof panel 57 according to embodiments of the disclosure. As shown, the intake expansion assembly 48 may include one or more sensors 174 connected to the main housing 36 and/or the intake expansion assembly 48, and positioned to generate one or more position signals indicative of a position of the intake expansion assembly 48 relative to the main housing 36. For example, in the example embodiment shown in FIG. 11A, the sensor 174 includes a proximity sensor including a transceiver 176 attached to the remote end 42 on the main housing wall 38 and configured to send a signal toward a reflector 178 attached to the perimeter edge 108 of the roof panel 57 of the intake expansion assembly 48. In some embodiments, the transceiver 176 may be configured to generate and receive signals reflected by the reflector 178, which may be used to determine the distance between the remote end 42 of main housing wall 38 and the perimeter edge 108 of the roof panel 57, which may be used to determine whether the intake expansion assembly 48 is retracted or extended.

As shown in FIG. 11B, in some embodiments, the example sensor 174 includes a potentiometer including a cylinder 180 attached adjacent the remote end 42 of the main housing wall 38 and a rod 182 received in the cylinder 180 and attached the perimeter edge 108 of the roof panel 57 of the intake expansion assembly 48. In some embodiments, potentiometer may include a transducer configured to generate signals indicative of the distance between the remote end 42 of main housing wall 38 and the perimeter edge 108 of the roof panel 57 based at least in part on the position of the rod 182 relative to the cylinder 180, which may be used to determine whether the intake expansion assembly 48 is retracted or extended.

Figure 12:
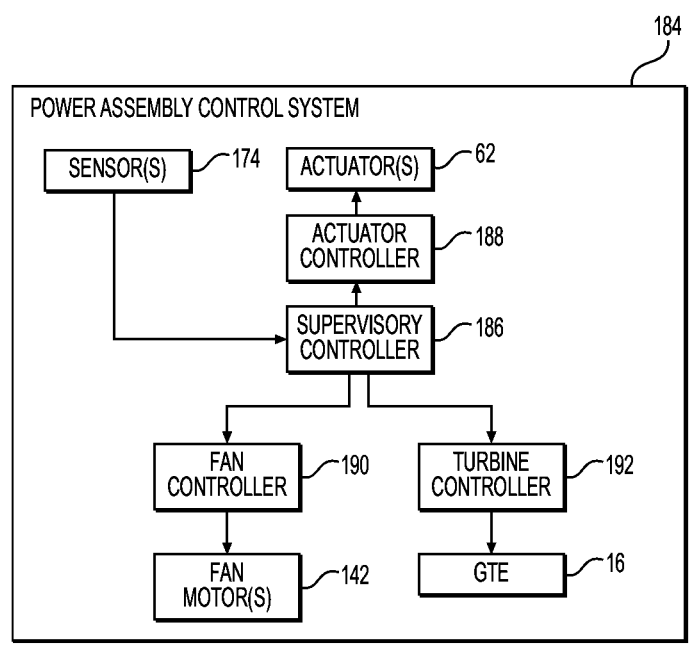
FIG. 12 is a schematic illustration of an example power assembly arrangement including an example supervisory controller for controlling operation of an example power assembly according to embodiments of the disclosure.

FIG. 12 is a schematic illustration of an example power assembly control system 184 for controlling operation of an example power assembly 32 according to embodiments of the disclosure. As shown in FIG. 12, the example power assembly control system 184 may include a supervisory controller 186 in communication with the one or more actuators 62 and configured to cause the one or more actuators 62 to activate and cause movement of the intake expansion assembly 48 between the first retracted position and the second extended position. For example, the power assembly control system 184 may include an actuator controller 188 configured to receive one or more signals from the supervisory controller 186 to activate the one or more actuators 62. For example, the actuator controller 188 may cause the hydraulic assembly 124 (FIG. 7) to operate and cause activation of the one or more actuators 62, for example, as previously explained herein. In some examples, the actuators 62 may be electric actuators, and the actuator controller 188 may be configured to cause operation of an electrical assembly to activate the electric actuators.

As shown in FIG. 12, in some embodiments, the one or more sensors 174 may be in communication with the supervisory controller 186 and may generate one or more position signals indicative of a position of the intake expansion assembly 48 relative to the main housing 36, for example, as described previously herein. The power assembly control system 184 may be configured to receive the one or more position signals and either prevent or allow operation of the GTE 16 and/or the one or more fans 138, for example, based at least in part on whether the one or more position signals indicate the intake expansion assembly 48 is in the second extended position. For example, if the supervisory controller 186 determines that the intake expansion assembly 48 is not in the second extended position, the supervisory controller 186 may prevent the one or more fans 138 from being activated and/or prevent the GTE 16 from starting operation.

For example, as shown in FIG. 12, the power assembly control system 184 may include a fan controller 190 in communication with the supervisory controller 186 and configured to receive signals from the supervisory controller 186 to activate the one or more fan motors 142 of the one or more fans 138, for example, based at least in part on whether the intake expansion assembly 48 is in the second extended position. If not, the supervisory controller 186 may not send activation signals to the one or more fan motors 142, preventing operation of the one or more fans 138, unless the intake expansion assembly 48 is in the second extended position.

As shown in FIG. 12, in some embodiments, the power assembly control system 184 may include a turbine controller 192 in communication with the supervisory controller 186 and configured to receive signals from the supervisory controller 186 to activate operation of the GTE 16, for example, initiating a start-up sequence for the GTE 16, based at least in part on whether the intake expansion assembly 48 is in the second extended position. If not, the supervisory controller 186 may not send activation signals to the turbine controller 192, preventing operation of the GTE 16, unless the intake expansion assembly 48 is in the second extended position.

Figure 13:
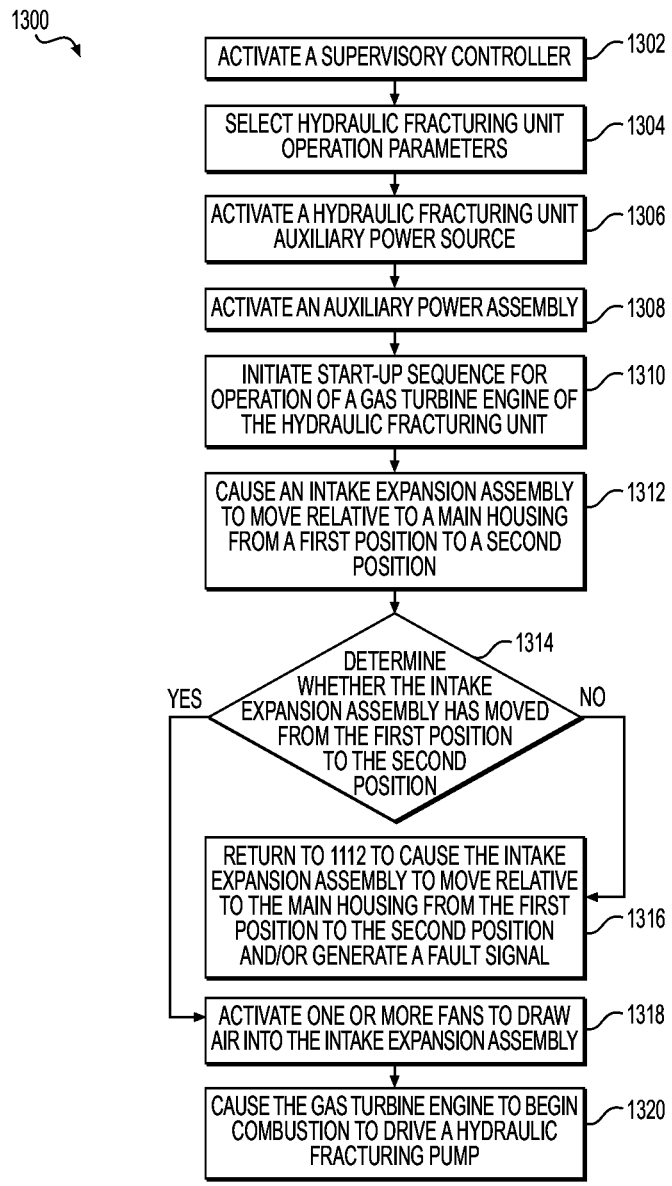
FIG. 13 is a block diagram of an example method for operating a gas turbine engine of an example hydraulic fracturing unit according to an embodiment of the disclosure.

FIG. 13 is a block diagram of an example method 1300 for operating a gas turbine engine of an example hydraulic fracturing unit according to an embodiment of the disclosure, illustrated as a collection of blocks in a logical flow graph, which represent a sequence of operations. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described blocks can be combined in any order and/or in parallel to implement the methods.

FIG. 13 is a flow diagram of an embodiment of a method 1300 for operating a gas turbine engine of an example hydraulic fracturing unit, for example, associated with a hydraulic fracturing system, according to an embodiment of the disclosure.

The example method 1300, at 1302, may include activating a supervisory controller configured to control operation of one or more components of a hydraulic fracturing unit. In some embodiments, this may include initiating operation of a supervisory controller configured to control operation of a hydraulic fracturing pump, a gas turbine engine, one or more fans, one or more actuators, and/or auxiliary systems of the hydraulic fracturing unit, including, for example, a hydraulic assembly, an electric assembly, and/or a pneumatic assembly.

At 1304, the example method 1300 further may include selecting one or more hydraulic fracturing unit operating parameters associated with operating the hydraulic featuring unit. For example, the hydraulic fracturing unit may include an operator interface, which may be used by an operator to select operating parameters, which may include parameters related to operation of a hydraulic fracturing pump of the hydraulic fracturing unit, such as pump speed, pump output including pump pressure and/or flow rate of a fracturing fluid pumped by the hydraulic fracturing pump. In some examples, operating parameters may relate to operation of the gas turbine engine, such as engine speed, power output, fuel source, and/or type(s) of fuel, as will be understood by those skilled in the art.

At 1306, the example method 1300 also may include activating a hydraulic fracturing unit auxiliary power source. For example, the hydraulic fracturing unit may include a hydraulic assembly configured to operate one or more hydraulic components used to facilitate operation of the hydraulic fracturing unit, for example, as discussed herein. In some embodiments, this also, or alternatively, may include activation of an electric assembly to operate one or more electrical components used to facilitate operation of the hydraulic fracturing unit, for example, as discussed herein.

The example method 1300, at 1308, further may include activating an auxiliary power assembly. For example, the hydraulic fracturing unit may include an internal combustion engine to supply power to auxiliary assemblies of the hydraulic fracturing unit, and the internal combustion engine may be started.

The example method 1300, at 1310, also may include initiating a start-up sequence for operation of the gas turbine engine of the hydraulic fracturing unit. For example, starting the gas turbine engine, in some embodiments, may require a sequence of multiple steps to start the gas turbine engine, such as activating a fuel pump and/or opening a fuel valve to provide a flow of fuel to the combustion section of gas turbine engine and/or initiating rotation of the compressor section of the gas turbine engine via the auxiliary power assembly.

At 1312, the example method 1300 also may include causing an intake expansion assembly of an enclosure for the gas turbine engine to move relative to a main housing from a first or retracted position to a second or extended position, such that intake ports of the intake expansion assembly are positioned to supply air to the gas turbine engine, for example, as described herein. For example, a supervisory controller may be configured to communicate one or more signals to an actuator controller (or directly to one or more actuators) to activate one or more actuators to cause the intake expansion assembly to extend from the main housing.

At 1314, the example method 1300 may further include determining whether the intake expansion assembly has moved to the second or extended position. For example, one or more sensors connected to the main housing and/or the intake expansion assembly may be configured to generate one or more position signals indicative of the position of the intake expansion assembly relative to the main housing, for example, as described herein. In some embodiments, the supervisory controller may be configured to receive the one or more position signals and determine whether the intake expansion assembly is in the second position.

If, at 1314, it is determined that the intake expansion assembly is not in the second position, at 1316, the example method 1300 further may include returning to 1312 and attempting to move the intake expansion assembly to the second position and/or to generate a fault signal that may notify an operator that the intake expansion assembly is not in the second position. For example, a supervisory controller may generate one or more signals to once again attempt to cause the one or more actuators to extend the intake expansion assembly. In some embodiments, the supervisory controller also, or alternatively, may generate a fault signal to notify an operator of the failure of the intake expansion assembly to move the second position, which may be displayed on an output device, such as a computer display, a smart phone display, a computer tablet display, a portable computer display, and/or a control panel display associated with the hydraulic fracturing unit. In some embodiments, the fault signal may be conveyed visually, audibly, and/or tactilely (e.g., via vibration of a hand-held device).

If, at 1314, it is determined that the intake expansion assembly is in the second position, at 1318, the example method 1300 may include activating one or more fans to draw air into the intake expansion assembly. For example, the supervisory controller may communicate one or more signals to a fan controller configured to activate the one or more fans in the intake expansion assembly, for example, as described previously herein.

The example method 1300, at 1320, further may include causing the gas turbine engine to begin combustion to drive the hydraulic fracturing pump via, for example, connection through a transmission and driveshaft, as described herein. In some embodiments, the supervisory controller may be configured to communicate one or more signals to a turbine controller configured to commence operation the gas turbine engine, for example, by completing the start-up sequence.

It should be appreciated that subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

The controller 80 can include one or more industrial control systems (ICS), such as supervisory control and data acquisition (SCADA) systems, distributed control systems (DCS), and/or programmable logic controllers (PLCs). For example, the controller 80 may include one or more processors, which may operate to perform a variety of functions, as set forth herein. In some examples, the processor(s) may include a central processing unit (CPU), a graphics processing unit (GPU), both CPU and GPU, or other processing units or components. Additionally, at least some of the processor(s) may possess local memory, which also may store program modules, program data, and/or one or more operating systems. The processor(s) may interact with, or include, computer-readable media, which may include volatile memory (e.g., RAM), non-volatile memory (e.g., ROM, flash memory, miniature hard drive, memory card, or the like), or some combination thereof. The computer-readable media may be non-transitory computer-readable media. The computer-readable media may be configured to store computer-executable instructions, which when executed by a computer, perform various operations associated with the processor(s) to perform the operations described herein.

Example embodiments of controllers (e.g., the supervisory controller 186 and/or other controllers shown in FIG. 12) may be provided as a computer program item including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, example embodiments may also be provided as a computer program item including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

Having now described some illustrative embodiments of the disclosure, it should be apparent to those skilled in the art that the foregoing is merely illustrative and not limiting, having been presented by way of example only. Numerous modifications and other embodiments are within the scope of one of ordinary skill in the art and are contemplated as falling within the scope of the disclosure. In particular, although many of the examples presented herein involve specific combinations of method acts or system elements, it should be understood that those acts and those elements may be combined in other ways to accomplish the same objectives. Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is, therefore, to be understood that the embodiments described herein are presented by way of example only and that, within the scope of any appended claims and equivalents thereto, the embodiments of the disclosure may be practiced other than as specifically described.

Furthermore, the scope of the present disclosure shall be construed to cover various modifications, combinations, additions, alterations, etc., above and to the above-described embodiments, which shall be considered to be within the scope of this disclosure. Accordingly, various features and characteristics as discussed herein may be selectively interchanged and applied to other illustrated and non-illustrated embodiment, and numerous variations, modifications, and additions further can be made thereto without departing from the spirit and scope of the present invention as set forth in the appended claims.

What is claimed is:

1. An enclosure to increase intake air flow to a gas turbine engine when positioned in the enclosure, the enclosure comprising:
   the gas turbine engine positioned inside the enclosure;
   a main housing comprising a main housing wall to connect to a platform to support the enclosure and the gas turbine engine, the main housing wall comprising a remote end defining an upper perimeter;
   an intake expansion assembly to enhance intake aft flow to the gas turbine engine, the intake expansion assembly comprising:
      an intake expansion wall comprising:
         a first end defining an expansion perimeter positioned to fit one of inside or outside the upper perimeter of the main housing;
         a second end opposite the first end, the intake expansion wall defining a plurality of intake ports positioned to supply intake air to the gas turbine engine when positioned in the enclosure; and
         a roof panel connected to the second end of the intake expansion wall and enclosing the second end of the intake expansion wall; and
      one or more actuators connected to the main housing and the intake expansion assembly and positioned to cause the intake expansion assembly to move relative to the main housing between a first position preventing air flow through the plurality of intake ports and a second position providing air flow through the plurality of intake ports to an interior of the enclosure.

2. The enclosure of claim 1, further comprising a flexible membrane extending between the main housing wall and the intake expansion wall, the flexible membrane providing a barrier to prevent air from passing between the main housing wall and the intake expansion wall.

3. The enclosure of claim 1, further comprising a plurality of filters connected to the intake expansion wall to filter air entering the enclosure via the plurality of intake ports.

4. The enclosure of claim 3, wherein the roof panel comprises a plurality of filter slots, each of the plurality of filter slots being positioned to receive one or more of the plurality of filters.

5. The enclosure of claim 4, wherein the plurality of filters comprises a plurality of first filters, and the enclosure further comprises a plurality of second filters positioned in the intake expansion assembly between the plurality of first filters and an intake of the gas turbine engine.

6. The enclosure of claim 1, further comprising an expansion base connected to the intake expansion wall, the expansion base comprising an expansion base intake port to provide intake flow between the plurality of intake ports and an intake of the gas turbine engine when positioned in the enclosure.

7. The enclosure of claim 6, further comprising an intake duct connected to the expansion base and to connect to an intake of the gas turbine engine when positioned in the enclosure, the intake duct being flexible to change from retracted condition to an extended condition.

8. The enclosure of claim 1, further comprising one or more fans connected to the intake expansion assembly to draw air into the enclosure via the one or more intake ports.

9. The enclosure of claim 1, wherein the intake expansion wall is positioned with respect to the main housing wall, such that activation of the one or more actuators causes the intake expansion wall to move between a retracted position preventing air flow through the plurality of intake ports to an extended position providing air flow through the plurality of intake ports to an interior of the enclosure.

10. The enclosure of claim 1, wherein the expansion perimeter of the intake expansion wall is positioned to fit inside the upper perimeter of the main housing.

11. The enclosure of claim 1, wherein the one or more actuators comprise one or more linear actuators comprising a first end connected to the main housing wall and a second end connected to the intake expansion assembly and positioned such that activation of the one or more linear actuators causes the intake expansion wall to move between a retracted position preventing air flow through the plurality of intake ports to an extended position providing air flow through the plurality of intake ports to an interior of the enclosure.

12. The enclosure of claim 11, wherein the roof panel comprises a perimeter edge extending laterally beyond an outer surface of the intake expansion wall, and the second end of the one or more actuators is connected to the perimeter edge of the roof panel.

13. The enclosure of claim 1, wherein the one or more actuators comprise one or more rotary actuators comprising an actuator base connected to one of the main housing or the intake expansion assembly and a rotary member connected to a linkage connected to one of the main housing or the intake expansion assembly, such that activation of the one or more rotary actuators causes the intake expansion wall to move between a retracted position preventing air flow through the plurality of intake ports to an extended position providing air flow through the plurality of intake ports to an interior of the enclosure.

14. The enclosure of claim 1, further comprising a supervisory controller in communication with the one or more actuators and configured to cause the one or more actuators to activate and cause movement of the intake expansion wall between the first position and the second position.

15. The enclosure of claim 14, further comprising one or more sensors in communication with the supervisory controller and connected to one or more of the main housing or the intake expansion assembly and positioned to generate one or more position signals indicative of a position of the intake expansion assembly relative to the main housing.

16. The enclosure of claim 15, wherein the supervisory controller is configured to be in communication with a turbine controller configured to initiate operation of the gas turbine engine, and wherein the supervisory controller is configured to: receive the one or more position signals from the one or more sensors; and determine the position of the intake expansion assembly relative to the main housing using said position signals; and based at least in part on the position, prevent initiation of operation of the gas turbine engine.

17. The enclosure of claim 1, further comprising:
one or more fans connected to the intake expansion assembly to draw air into the enclosure via the one or more intake ports; and
a supervisory controller in communication with the one or more fans and configured to activate the one or more fans when the intake expansion wall is in the second position.

18. The enclosure of claim 1, further comprising cooling coils connected to an interior of the intake expansion assembly and positioned to cool air prior to entering an intake of the gas turbine engine.

19. The enclosure of claim 1, further comprising an interior partition connected to an interior of the intake expansion assembly and positioned to provide a first portion of the interior of the intake expansion assembly and a second portion of the interior of the intake expansion assembly.

20. The enclosure of claim 19, further comprising:
a first fan connected to the interior of the intake expansion assembly and positioned to pull air into the first portion of the interior of the intake expansion assembly; and
a second fan connected to the interior of the intake expansion assembly and positioned to pull air into the second portion of the interior of the intake expansion assembly.

21. The enclosure of claim 1, further comprising one or more seal material segments on an interior side of the roof panel and positioned to provide a seal between one or more components positioned in an interior of the intake expansion assembly and the interior side of the roof panel.

22. A power assembly to provide power to a hydraulic fracturing unit, the hydraulic fracturing unit including a driveshaft to connect to a hydraulic fracturing pump, a transmission to connect to a gas turbine engine for driving the driveshaft and thereby the hydraulic fracturing pump, the power assembly comprising:
an enclosure to connect to and be supported by a platform; and
a gas turbine engine positioned in the enclosure and to be connected to the hydraulic fracturing pump via the transmission and the driveshaft;
the enclosure comprising:

a main housing comprising a main housing wall to connect to a platform to support the enclosure and the gas turbine engine;

an intake expansion assembly to enhance intake air flow to the gas turbine engine, the intake expansion assembly comprising:

an intake expansion wall defining a plurality of intake ports positioned to supply intake air to the gas turbine engine positioned in the enclosure comprising:

a first end defining an expansion perimeter positioned to fit one of inside or outside the upper perimeter of the main housing;

a second end opposite the first end, a roof panel connected to the second end of the intake expansion wall and enclosing the second end of the intake expansion wall; and one or more actuators connected to the main housing and the intake expansion assembly and positioned to cause the intake expansion assembly to move relative to the main housing between a first position preventing air flow through the plurality of intake ports and a second position providing air flow through the plurality of intake ports to an interior of the enclosure.

23. The power assembly of claim 22, wherein:
the gas turbine engine comprises an intake and an exhaust duct;
the main housing wall comprises an exhaust duct port through which exhaust from operation of the gas turbine engine passes via the exhaust duct; and
the intake expansion wall is devoid of an intake port adjacent the exhaust duct port to prevent exhaust from entering an intake of the gas turbine engine during operation.

24. The power assembly of claim 22, further comprising a plurality of filters connected to the intake expansion wall to filter air entering the enclosure via the plurality of intake ports,
wherein the plurality of filters comprises a plurality of first filters, and the enclosure further comprises a plurality of second filters positioned in the intake expansion assembly between the plurality of first filters and an intake of the gas turbine engine.

25. The power assembly of claim 22, wherein the gas turbine engine comprises an intake, and the intake expansion assembly further comprises an expansion base connected to the intake expansion wall, the expansion base comprising one or more expansion base intake ports providing intake flow between the one or more of the expansion base intake ports and an intake of the gas turbine engine when the intake expansion wall is in the second position.

26. The power assembly of claim 25, further comprising an intake duct connected to the expansion base and the intake of the gas turbine engine, the intake duct being flexible to change from an at least partially retracted condition to an extended condition when the intake expansion wall moves from the first position to the second position.

27. A method for operating a gas turbine engine positioned in an enclosure comprising a main housing and an intake expansion assembly comprising:

a first end defining an expansion perimeter positioned to fit one of inside or outside the upper perimeter of the main housing;

a second end opposite the first end, the intake expansion assembly defining a plurality of intake ports to supply intake air to the gas turbine engine when positioned in the enclosure; and a roof panel connected to the second end of the intake expansion assembly and enclosing the second end of the intake expansion assembly; the method comprising:

activating one or more actuators to cause the intake expansion assembly to move relative to the main housing from a first position preventing air flow through the plurality of intake ports to a second position providing air flow through the plurality of intake ports to an interior of the enclosure;

receiving one or more position signals from one or more sensors configured to generate signals indicative of a position of the intake expansion assembly relative to the main housing;

determining, based at least in part on the one or more position signals, whether the intake expansion assembly is in the second position; and initiating operation of the gas turbine engine when the intake expansion assembly is in the second position.

28. The method of claim 27, further comprising:
initiating, based at least in part on the one or more position signals, operation of one or more fans connected to the intake expansion assembly and positioned to draw air into the intake expansion assembly when the intake expansion assembly is in the second position.

29. The method of claim 27, wherein activating one or more actuators to cause the intake expansion assembly to move relative to the main housing comprises causing the intake expansion to extend from the first position in which the intake expansion assembly is received in the main housing to the second position in which the intake expansion assembly extends from the main housing.

30. The method of claim 27, wherein the one or more actuators comprise one or more hydraulic actuators, and the method further comprises activating a hydraulic assembly to supply hydraulic fluid to the one or more hydraulic actuators.

* * * * *